(12) United States Patent
Wang et al.

(10) Patent No.: US 12,096,397 B2
(45) Date of Patent: Sep. 17, 2024

(54) PAGING MESSAGE SENDING AND RECEIVING METHOD AND APPARATUS

(71) Applicant: Huawei Technologies Co., Ltd., Shenzhen (CN)

(72) Inventors: Junwei Wang, Shenzhen (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 17/555,036

(22) Filed: Dec. 17, 2021

(65) Prior Publication Data
US 2022/0110090 A1    Apr. 7, 2022

Related U.S. Application Data

(63) Continuation of application No. PCT/CN2020/095196, filed on Jun. 9, 2020.

(30) Foreign Application Priority Data

Jun. 21, 2019  (CN) .......................... 201910544601.1

(51) Int. Cl.
H04W 68/02 (2009.01)
H04W 68/00 (2009.01)

(52) U.S. Cl.
CPC ......... H04W 68/005 (2013.01); H04W 68/02 (2013.01)

(58) Field of Classification Search
CPC ... H04W 68/02; H04W 68/005; H04W 88/08; H04W 52/243; H04W 52/242; H04W 52/367
See application file for complete search history.

(56) References Cited

U.S. PATENT DOCUMENTS 9,769,789 B2    9/2017  Damnjanovic et al.
9,907,051 B2    2/2018  Wang et al.
10,299,084 B1*  5/2019  Park ..................... H04W 76/40
11,076,379 B2   7/2021  Liu et al.
11,178,634 B2   11/2021 Tang
(Continued)

FOREIGN PATENT DOCUMENTS

CN    101601319 A    12/2009
CN    103124399 A     5/2013
(Continued)

OTHER PUBLICATIONS

"UE Power Savings for Paging," Agenda Item: 7.2.9.4, Source: Huawei, HiSilicon, Document for: Discussion and Decision, 3GPP TSG RAN WG1 Meeting #96, R1-1903192, XP51600888A, Feb. 25-Mar. 1, 2019, 5 pages.
(Continued)

Primary Examiner — Dai Phuong
(74) Attorney, Agent, or Firm — SLATER MATSIL, LLP

(57) ABSTRACT

A paging message sending and receiving method and apparatus, the method including receiving, by a terminal device, paging indication information from a network device, where the paging indication information indicates whether at least one paging group needs to receive a paging message, and determining, by the terminal device based on the paging indication information, a paging occasion on which a paging group in which the terminal device is located receives the paging message.

16 Claims, 22 Drawing Sheets

(56) References Cited

U.S. PATENT DOCUMENTS

| | | | |
|---|---|---|---|
| 2008/0182596 | A1 | 7/2008 | Wang et al. |
| 2012/0122495 | A1 | 5/2012 | Weng et al. |
| 2013/0115977 | A1* | 5/2013 | Chandramouli ........ H04W 4/08 455/515 |
| 2016/0014718 | A1 | 1/2016 | Mysore Balasubramanya et al. |
| 2018/0199310 | A1* | 7/2018 | Islam .................. H04W 68/025 |
| 2019/0261310 | A1* | 8/2019 | Martin .............. H04W 72/0446 |

FOREIGN PATENT DOCUMENTS

| | | |
|---|---|---|
| CN | 106576325 A | 4/2017 |
| CN | 109246818 A | 1/2019 |
| CN | 109792712 A | 5/2019 |
| WO | 2019024698 A1 | 2/2019 |
| WO | 2019086674 A1 | 5/2019 |

OTHER PUBLICATIONS

"System Information Handling and Paging Operation in NR-U," Agenda Item: 11.2.2.1, Source: OPPO, Document for: Discussion and Decision, 3GPP TSG-RAN WG2 Meeting #103bis, R2-1813591, XP51523092A, Oct. 8-12, 2018, 3 pages.

"3rd Generation Partnership Project; Technical Specification Group Radio Access Network; NR; Physical layer procedures for data (Release 15)," 3GPP TS 38.214 V15.5.0, Mar. 2019, 103 pages.

"3rd Generation Partnership Project; Technical Specification Group Radio Access Network; NR; Radio Resource Control (RRC) protocol specification (Release 15)," 3GPP TS 38.331 V15.5.1, Apr. 2019, 491 pages.

"Initial Access and Mobility Procedures in NR-U," Agenda Item: 7.2.2.4.2, Source: InterDigital Inc., Document for: Discussion and Decision, 3GPP TSG RAN WG1 Meeting #94bis, R1-1811205, Chengdu, China, Oct. 8-12, 2018, 11 pages.

"Discussion on Procedures for Initial Access and Mobility in NR-U," Agenda Item:7.2.2.4.2, Source: InterDigital Inc., Document for: Discussion and Decision, 3GPP TSG RAN WG1 Meeting #95, R1-1813221, Spokane, USA, Nov. 12-16, 2018, 13 pages.

"Initial Access and Mobility Procedures for NR Unlicensed," Agenda item: 7.2.2.2.2, Source: Qualcomm Incorporated, Document for: Discussion and Decision, 3GPP TSG RAN WG1 Meeting #96, R1-1902986, Athens, Greece, Feb. 25-Mar. 1, 2019, 14 pages.

"Initial Access and Mobility Procedures for NR Unlicensed," Agenda item: 7.2.2.2.2, Source: Qualcomm Incorporated, Document for: Discussion and Decision, 3GPP TSG RAN WG1 Meeting #97, R1-1907262, Reno, US, May 13-May 17, 2019, 16 pages.

"Measurement Quantities and Cell Quality Derivation in NR," Agenda Item: 10.4.1.4.6, Source: MediaTek Inc., Document for: Discussion and decision, 3GPP TSG-RAN WG2 Meeting #99bis, R2-1710801, Prague, Czech Republic, Oct. 9-13, 2017, 3 pages.

\* cited by examiner

| A UE receives a discovery reference signal DRS, where the DRS includes indication information, and the indication information is used for indicating a time domain position of a paging occasion in a time window | 221 |

| The UE receives a paging message on the paging occasion | 222 |

PAGING MESSAGE SENDING AND RECEIVING METHOD AND APPARATUS

CROSS-REFERENCE TO RELATED APPLICATIONS

This application is a continuation of International Application No. PCT/CN2020/095196, filed on Jun. 9, 2020, which claims priority to Chinese Patent Application No. 201910544601.1, filed on Jun. 21, 2019. The disclosures of the aforementioned applications are hereby incorporated by reference in their entireties.

TECHNICAL FIELD

This application relates to the field of communications technologies, and in particular, to a paging message sending and receiving method and apparatus.

BACKGROUND

In a mobile communications system, a paging message is sent and received based on different service requirements. An objective of the paging message is to notify a terminal device that a network needs to send information, so that the terminal device receives the information. When the network device sends the paging message, the terminal device may be in an idle state or a connected state. In the idle state, the terminal device needs to cyclically receive the paging message, and this cycle is a paging cycle. However, a specific paging occasion (paging occasion, PO) on which the terminal device receives the paging message is determined by the network system and the terminal device based on a protocol, and each terminal device has only one paging occasion in one paging cycle.

With development of a mobile bandwidth (mobile broadband, MBB) service, users have an increasing requirement for a throughput rate of a wireless network bandwidth. To better use an unlicensed spectrum resource and provide a higher service rate and better user experience for users, an unlicensed access technology is introduced into long term evolution (LTE) and new radio (NR) systems. Compared with exclusivity of a licensed spectrum, the unlicensed spectrum has a sharing property. To be specific, an access point can receive and send data by using the unlicensed spectrum provided that the access point complies with a specific regulation. To enable access nodes to coexist well, a listen before talk (LBT) mechanism may be used. In other words, before sending data, any network node needs to monitor a channel to be used for sending, and data can be sent only when the channel is in an idle state. Otherwise, monitoring needs to be continued. To facilitate the terminal device to search for a base station cell signal and camp on a cell, the network device usually sends a discovery reference signal (DRS). When channel monitoring by using the LBT mechanism is unsuccessful, a sending periodicity of the DRS is indeterminate. To resolve the problem that unsuccessful LBT causes indeterminacy of the sending periodicity of a DRS, a DTMC (DRS time measurement configuration) window is used in a standard. To be specific, the DRS may be sent only in this DTMC window, as shown in FIG. 1. When the LBT monitoring succeeds, the network sends the DRS in the DTMC window and sends a paging message to the terminal device at the same time. However, when the LBT monitoring is unsuccessful, the paging message cannot be sent. In other words, for the unlicensed spectrum, the network device has indeterminacy about obtaining a permission to send information. This may cause a case in which the paging message cannot be effectively sent to the terminal device. For example, as shown in FIG. 2, a PO1 (the first paging occasion) corresponds to a paging group 1 (the first paging group including terminal devices), a PO2 (the second paging occasion) corresponds to a paging group 2 (the second paging group including terminal devices), a PO3 (the third paging occasion) corresponds to a paging group 3 (the third paging group including terminal devices), and a PO4 (the fourth paging occasion) corresponds to a paging group 4 (the fourth paging group including terminal devices). At a start moment of the PO1, because the network device successfully performs LBT monitoring and obtains a permission to send data, the network device may send the paging message for the paging group 1 on the PO1. At a start moment of the PO2, the network device does not obtain the permission to send data, and therefore cannot send the paging message for the paging group 2 on the PO2.

Currently, opportunities of successfully sending a paging message may be increased by increasing paging opportunities. For example, as shown in FIG. 3, for the PO2, a paging opportunity PO2a is added to the PO2. To be specific, when the terminal device in the paging group 2 does not receive a valid paging message on the PO2, the paging group 2 continues to detect the paging message on the PO2a. However, although opportunities of successfully sending the paging message are increased in this manner, a case in which the base station does not obtain a data sending permission when opportunities are newly added cannot be avoided, and power consumption of the terminal device is also increased. Especially, when the network device does not send a paging message, two times of blind detection performed by the terminal device are both invalid.

SUMMARY

Embodiments of this application provide a paging message sending and receiving method and apparatus, to alleviate impact that is on paging message reception by a terminal device and that is caused by unsuccessful LBT monitoring in an unlicensed spectrum.

According to a first aspect, a paging message receiving method is provided. The method includes a terminal device receives paging indication information sent by a network device, where the paging indication information is used for indicating whether at least one paging group needs to receive a paging message, and the terminal device determines, based on the paging indication information, a paging occasion on which a paging group in which the terminal device is located receives the paging message. The terminal device may be a user equipment (UE), and the network device may be a base station.

It should be understood that, in this embodiment of this application, when the terminal device determines, based on the paging indication information, that the paging message needs to be received, the terminal device does not receive the paging message on a paging occasion configured by a paging group, as specified in a protocol in a conventional technology. Instead, the terminal device needs to further determine, based on the paging indication information, the paging occasion of receiving the paging message. In other words, in this embodiment of this application, when the paging group receives the paging message after receiving the paging indication information, a correspondence between paging occasions and paging groups is not fixed. The paging group may flexibly adjust the correspondence between paging occasions and paging groups based on the paging indication information. In a possible design, if there is no paging message on a paging occasion before a paging occasion configured by the terminal device, the terminal device may receive, in advance on the paging occasion on which there is no paging message, the paging message that the terminal device needs to receive. For example, the paging indication information indicates that the first paging group does not need to receive the paging message. Then, if the second paging group needs to receive the paging message, the second paging group may receive the paging message in advance on a paging occasion corresponding to the first paging group. In this way, a delay in which the UE cannot receive the paging message in time due to unsuccessful LBT monitoring can be reduced.

In a possible design, the paging indication information includes N bits, each bit in the N bits corresponds to one paging group, and N is a quantity of paging groups. For example, when N is 4, values of 4 bits are 0110, and the 4 bits correspond to four paging groups.

In a possible design, that the terminal device determines, based on the paging indication information, a paging occasion on which a paging group in which the terminal device is located receives the paging message includes determining a number m of the first paging group that needs to receive the paging message, determining a number n of the paging group in which the terminal device is located, and determining, by the terminal device, that the paging occasion on which the paging group in which the terminal device is located receives the paging message is n−m+1, where n and m are positive integers less than or equal to N. Herein, n is less than or equal to m. For example, m=3 and n=6. To be specific, the paging group number of the first paging group that needs to receive the paging message is 3, and the number of the paging group in which the terminal device is located is 6. Then, the paging occasion on which the paging group in which the terminal device is located receives the paging message is 4, namely, the fourth paging occasion. Based on the conventional technology, the paging occasion of the paging group in which the terminal device is located is supposed to correspond to the paging group number. That is, the paging group number 6 corresponds to the sixth paging occasion. Then, based on the method for determining the paging occasion in this application, the paging occasion of the paging group 6 in which the terminal device is located is adjusted from the sixth paging occasion to the fourth paging occasion, so that a delay in which the UE in which the terminal device is located receives the paging message is reduced.

In a possible design, that the terminal device determines, based on the paging indication information, a paging occasion on which a paging group in which the terminal device is located receives the paging message includes determining a number m of the first paging group that needs to receive the paging message, determining a number n of the paging group in which the terminal device is located, and if n=m, determining, by the terminal device, that the paging occasion on which the paging group in which the terminal device is located receives the paging message is 1, or if n m, determining, by the terminal device, that the paging occasion on which the paging group in which the terminal device is located receives the paging message is n, where n and m are positive integers less than or equal to N. It may be understood that, if the number of the paging group in which the terminal device is located is the number of the first paging group that needs to receive the paging message, the paging occasion of the paging group in which the terminal device is located is the first paging occasion, and the first paging occasion is usually in a time window. To be specific, the paging occasion n of the paging group in which the terminal device is located is adjusted to the paging occasion 1 in the time window, so that the delay in which a terminal device group in which the terminal device is located receives the paging message is reduced. If the number of the paging group in which the terminal device is located is not the number of the first paging group that needs to receive the paging message, the paging occasion on which the terminal device receives the paging message remains unchanged. To be specific, the paging occasion does not need to be adjusted, a sequence number of the paging occasion still corresponds to the paging group number, and both are n.

In a possible design, that the terminal device determines, based on the paging indication information, a paging occasion on which a paging group in which the terminal device is located receives the paging message includes if the terminal device determines, based on the paging indication information, that the paging group in which the terminal device is located does not need to receive the paging message, the terminal device skips determining the paging occasion, or skips receiving the paging message on the corresponding paging occasion. In other words, a terminal device that does not need to receive the paging message does not need to determine a paging occasion based on the paging indication information.

In a possible design, that a terminal device receives paging indication information sent by a network device includes the terminal device receives, on a common control channel in a time window, the paging indication information sent by the network device, or the terminal device receives, on the first paging occasion, the paging indication information sent by the network device, where the first paging occasion is in the time window. The time window may be understood as a DTMC time window. If the terminal device receives, on the first paging occasion, the paging indication information sent by the network device, it may be understood that, not only a paging message of a paging group but also the paging indication information need to be sent on the first paging occasion.

In a possible design, that a terminal device receives paging indication information sent by a network device includes the terminal device receives paging scheduling information sent by the network device, where the paging scheduling information includes the paging indication information, and the paging indication information includes at least one of a first indication value and a second indication value, the first indication value is used for indicating that the at least one paging group needs to receive the paging message, and the second indication value is used for indicating that the at least one paging group does not need to receive the paging message. It may be understood that, the paging indication information may be a plurality of bit values. The bit value may be the first indication value 1 or the second indication value 0, where 1 represents that a corresponding paging group needs to receive the paging message, and 0 represents that a corresponding paging group does not need to receive the paging message.

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field. If some of the fields of the paging scheduling information are not used for indicating some information, the paging indication information mentioned in this application may be indicated by using at least one of the fields of the paging scheduling information mentioned herein. To be specific, the paging indication information is indicated by using an existing information element.

In a possible design, the paging indication information further includes a paging group number corresponding to each paging group in the at least one paging group. For example, there are two paging groups. A paging group number of a paging group 1 may be 1, and a paging group number of a paging group 2 may be 2. If the paging indication information includes bit values and does not include paging group numbers, it may be understood that the paging indication information is indicated in an implicit manner. For example, 0110 sequentially indicate whether a paging group 1, a paging group 2, a paging group 3, and a paging group 4 need to receive the paging message. If the paging indication information includes bit values and paging group numbers, it may be understood that whether the four paging groups need to receive the paging message is indicated in an explicit manner. A paging group number 1 corresponds to the first bit 0, a paging group number 2 corresponds to the second bit 1, a paging group number 3 corresponds to the third bit 1, and a paging group number 4 corresponds to the fourth bit 0.

According to a second aspect, a paging message sending method is provided. The method includes a network device sends paging indication information, where the paging indication information is used for indicating whether at least one paging group needs to receive a paging message, and the network device determines, based on the paging indication information, a paging occasion of sending the paging message to each paging group in the at least one paging group.

It should be understood that, in this embodiment of this application, after the network device generates the paging indication information based on whether a paging group has the paging message and sends the paging indication information to the terminal device, the network device does not send or skip sending the paging message to the paging group based on a correspondence between paging occasions and paging groups specified in a protocol. The network device may be understood as a base station, and the terminal device may be a UE. In this embodiment of this application, before sending the paging message to the paging group, the network device further needs to determine, based on the paging indication information, the paging occasion of sending the paging message to the paging group. In other words, when the network device sends the paging message, a correspondence between paging occasions and paging groups is not fixed. The network device may flexibly adjust the correspondence between paging occasions and paging groups based on the paging indication information. In a possible design, if there is no paging message to be sent on a paging occasion, the network device may send, in advance on the paging occasion on which there is no paging message, the paging message to a subsequent paging group that has the paging message. For example, the paging indication information indicates that the first paging group does not need to receive the paging message. Then, if the second paging group needs to receive the paging message, the network device may send the paging message in advance to the second paging group on a paging occasion corresponding to the first paging group. In this way, a delay in which the UE cannot receive the paging message in time due to unsuccessful LBT monitoring can be reduced.

In a possible design, the paging indication information includes N bits, each bit in the N bits corresponds to one paging group, and N is a quantity of paging groups. For example, when N is 4, values of 4 bits are 0110, and the 4 bits correspond to four paging groups.

In a possible design, that the network device determines, based on the paging indication information, a paging occasion of sending the paging message to each paging group in the at least one paging group includes: determining a number m of the first paging group that needs to receive the paging message, determining a number n of each paging group in the at least one paging group, and determining that the paging occasion of sending the paging message to each paging group in the at least one paging group is n−m+1, where n and m are positive integers less than or equal to N. Herein, n is less than or equal to m. For example, m=3 and n=6. To be specific, the paging group number of the first paging group that needs to receive the paging message is 3, and a paging group number of a paging group 6 in the at least one paging group is 6. Then, the paging occasion on which the network device sends the paging message to the paging group 6 is 4, namely, the fourth paging occasion. Based on the conventional technology, the paging occasion of the paging group 6 is supposed to correspond to the paging group number 6. That is, the paging group number 6 corresponds to the sixth paging occasion. Then, based on the method for determining the paging occasion in this application, the paging occasion of the paging group number 6 is adjusted from the sixth paging occasion to the fourth paging occasion, so that a delay in which the UE in the paging group receives the paging message is reduced, and the network device does not need to perform LBT again before sending the paging message (because the network device already completes an LBT process before sending a DRS), to ensure reliability of sending the paging message.

In a possible design, that the network device determines, based on the paging indication information, a paging occasion of sending the paging message to each paging group in the at least one paging group includes: determining that the first paging occasion on which the paging message needs to be received is 1, and determining that the paging occasion of sending the paging message to each paging group in the at least one paging group is a number n of each paging group, where n is a positive integer less than or equal to N. In other words, a paging occasion on which each paging group in the at least one paging group except the first paging group that needs to receive the paging message is determined as each paging group number n. To be specific, the first paging group that needs to receive the paging message receives the paging message on the first paging occasion, and paging occasions of the other paging groups may remain unchanged. For example, if a paging group corresponding to a paging group number 3 is the first paging group that needs to receive the paging message, the network device determines that a paging occasion of the paging group corresponding to the paging group number 3 is a paging occasion 1. To be specific, the network device sends, on the paging occasion 1, the paging message to the paging group corresponding to the paging group number 3, and paging occasions of the other paging groups are respectively corresponding paging group numbers. For example, a paging group number of a paging group 4 is 4, and then a paging occasion of the paging group 4 is 4, namely, the fourth paging occasion.

In a possible design, that the network device determines, based on the paging indication information, a paging occasion of sending the paging message to each paging group in the at least one paging group includes: If the network device determines, based on the paging indication information, that the at least one paging group does not need to receive the paging message, the network device skips sending the paging message to the at least one paging group on the corresponding paging occasion. This may alternatively be implemented as follows: To reduce time for determining the paging occasion by the network device, the paging occasion may be determined only for a paging group that needs to receive the paging message, and the network device does not need to calculate a paging occasion for a paging group that does not need to receive the paging message.

In a possible design, that a network device sends paging indication information includes the network device sends the paging indication information on a common control channel in a time window, or the network device sends the paging indication information on the first paging occasion, where the first paging occasion is in the time window. If the network device sends the paging indication information on the first paging occasion, the network device not only needs to send a paging message of a paging group but also needs to send the paging indication information on the first paging occasion.

In a possible design, that a network device sends paging indication information includes the network device sends paging scheduling information, where the paging scheduling information includes the paging indication information, and the paging indication information includes at least one of a first indication value and a second indication value, the first indication value is used for indicating that the at least one paging group needs to receive the paging message, and the second indication value is used for indicating that the at least one paging group does not need to receive the paging message. For example, the paging indication information may be a plurality of bit values. The bit value may be the first indication value 1 or the second indication value 0, where 1 represents that the corresponding paging group needs to receive the paging message (or represents that the base station sends the paging message to the corresponding paging group), and 0 represents that the corresponding paging group does not need to receive the paging message (or represents that the base station does not send the paging message to the corresponding paging group).

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field. If some of the fields of the paging scheduling information are not used for indicating some information, the paging indication information mentioned in this application may be indicated by using at least one of the fields of the paging scheduling information mentioned herein. To be specific, the paging indication information is indicated by using an existing information element.

In a possible design, the paging indication information further includes a paging group number corresponding to each paging group in the at least one paging group. For example, there are two paging groups. A paging group number of a paging group 1 may be 1, and a paging group number of a paging group 2 may be 2. If the paging indication information includes bit values and does not include paging group numbers, it may be understood that the paging indication information is indicated in an implicit manner. For example, 0110 sequentially indicate whether a paging group 1, a paging group 2, a paging group 3, and a paging group 4 need to receive the paging message. If the paging indication information includes bit values and paging group numbers, it may be understood that whether the four paging groups need to receive the paging message is indicated in an explicit manner. A paging group number 1 corresponds to the first bit 0, a paging group number 2 corresponds to the second bit 1, a paging group number 3 corresponds to the third bit 1, and a paging group number 4 corresponds to the fourth bit 0.

According to a third aspect, a terminal device is provided. The terminal device includes a communications module, configured to receive paging indication information sent by a network device, where the paging indication information is used for indicating whether at least one paging group needs to receive a paging message, and a processing module, configured to determine, based on the paging indication information, a paging occasion on which a paging group in which the terminal device is located receives the paging message.

In a possible design, the paging indication information includes N bits, each bit in the N bits corresponds to one paging group, and N is a quantity of paging groups.

In a possible design, the processing module is configured to: determine a number m of the first paging group that needs to receive the paging message, determine a number n of the paging group in which the terminal device is located, and determine that the paging occasion on which the paging group in which the terminal device is located receives the paging message is n−m+1, where n and m are positive integers less than or equal to N.

In a possible design, the processing module is configured to: determine a number m of the first paging group that needs to receive the paging message, determine a number n of the paging group in which the terminal device is located, and if n=m, determine, by the terminal device, that the paging occasion on which the paging group in which the terminal device is located receives the paging message is 1, or if n m, determine, by the terminal device, that the paging occasion on which the paging group in which the terminal device is located receives the paging message is n, where n and m are positive integers less than or equal to N.

In a possible design, the processing module is configured to determine, based on the paging indication information, that the paging group in which the terminal device is located does not need to receive the paging message, and the terminal device skips determining the paging occasion, or skips receiving the paging message on the corresponding paging occasion.

In a possible design, the communications module is configured to: receive, on a common control channel in a time window, the paging indication information sent by the network device, or receive, on the first paging occasion, the paging indication information sent by the network device, where the first paging occasion is in the time window.

In a possible design, the communications module is configured to: receive paging scheduling information sent by the network device, where the paging scheduling information includes the paging indication information, and the paging indication information includes a first indication value and a second indication value, the first indication value is used for indicating that the at least one paging group needs to receive the paging message, and the second indication value is used for indicating that the at least one paging group does not need to receive the paging message.

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field.

In a possible design, the paging indication information further includes a paging group number corresponding to each paging group in the at least one paging group.

According to a fourth aspect, a network device is provided, including a communications module, configured to send paging indication information, where the paging indication information is used for indicating whether at least one paging group needs to receive a paging message, and a processing module, configured to determine, based on the paging indication information, a paging occasion of sending the paging message to each paging group in the at least one paging group.

In a possible design, the paging indication information includes N bits, each bit in the N bits corresponds to one paging group, and N is a quantity of paging groups.

In a possible design, the processing module is configured to: determine a number m of the first paging group that needs to receive the paging message, determine a number n of each paging group in the at least one paging group, and determine that the paging occasion of sending the paging message to each paging group in the at least one paging group is n−m+1, where n and m are positive integers less than or equal to N.

In a possible design, the processing module is configured to: determine that the first paging occasion on which the paging message needs to be received is 1, and determine that the paging occasion of sending the paging message to each paging group in the at least one paging group is a number n of each paging group, where n is a positive integer less than or equal to N.

In a possible design, the processing module is configured to: determine, based on the paging indication information, that the at least one paging group does not need to receive the paging message, and the network device skips sending the paging message to the at least one paging group on the corresponding paging occasion.

In a possible design, the communications module is configured to: send the paging indication information on a common control channel in a time window, or send the paging indication information on the first paging occasion, where the first paging occasion is in the time window.

In a possible design, the communications module is configured to: send paging scheduling information, where the paging scheduling information includes the paging indication information, and the paging indication information includes a first indication value and a second indication value, the first indication value is used for indicating that the at least one paging group needs to receive the paging message, and the second indication value is used for indicating that the at least one paging group does not need to receive the paging message.

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field.

In a possible design, the paging indication information further includes a paging group number corresponding to each paging group in the at least one paging group.

According to a fifth aspect, a terminal device is provided. The terminal device includes a transceiver, configured to receive paging indication information sent by a network device, where the paging indication information is used for indicating whether at least one paging group needs to receive a paging message, and a processor, configured to determine, based on the paging indication information, a paging occasion on which a paging group in which the terminal device is located receives the paging message.

In a possible design, the paging indication information includes N bits, each bit in the N bits corresponds to one paging group, and N is a quantity of paging groups.

In a possible design, the processor is configured to: determine a number m of the first paging group that needs to receive the paging message, determine a number n of the paging group in which the terminal device is located, and determine that the paging occasion on which the paging group in which the terminal device is located receives the paging message is n−m+1, where n and m are positive integers less than or equal to N.

In a possible design, the processor is configured to: determine a number m of the first paging group that needs to receive the paging message, determine a number n of the paging group in which the terminal device is located, and if n=m, determine that the paging occasion on which the paging group in which the terminal device is located receives the paging message is 1, or if n m, determine, by the terminal device, that the paging occasion on which the paging group in which the terminal device is located receives the paging message is n, where n and m are positive integers less than or equal to N.

In a possible design, the processor is configured to determine, based on the paging indication information, that the paging group in which the terminal device is located does not need to receive the paging message, and the terminal device skips determining the paging occasion, or skips receiving the paging message on the corresponding paging occasion.

In a possible design, the transceiver is configured to: receive, on a common control channel in a time window, the paging indication information sent by the network device, or receive, on the first paging occasion, the paging indication information sent by the network device, where the first paging occasion is in the time window.

In a possible design, the transceiver is configured to: receive paging scheduling information sent by the network device, where the paging scheduling information includes the paging indication information, and the paging indication information includes a first indication value and a second indication value, the first indication value is used for indicating that the at least one paging group needs to receive the paging message, and the second indication value is used for indicating that the at least one paging group does not need to receive the paging message.

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field.

In a possible design, the paging indication information further includes a paging group number corresponding to each paging group in the at least one paging group.

According to a sixth aspect, a network device is provided, including a transceiver, configured to send paging indication information, where the paging indication information is used for indicating whether at least one paging group needs to receive a paging message, and a processor, configured to determine, based on the paging indication information, a paging occasion of sending the paging message to each paging group in the at least one paging group.

In a possible design, the paging indication information includes N bits, each bit in the N bits corresponds to one paging group, and N is a quantity of paging groups.

In a possible design, the processor is configured to: determine a number m of the first paging group that needs to receive the paging message, determine a number n of each paging group in the at least one paging group, and determine that the paging occasion of sending the paging message to each paging group in the at least one paging group is n−m+1, where n and m are positive integers less than or equal to N.

In a possible design, the processor is configured to: determine that the first paging occasion on which the paging message needs to be received is 1, and determine that the paging occasion of sending the paging message to each paging group in the at least one paging group is a number n of each paging group, where n is a positive integer less than or equal to N.

In a possible design, the processor is configured to: determine, based on the paging indication information, that the at least one paging group does not need to receive the paging message, and skip sending the paging message to the at least one paging group on the corresponding paging occasion. Alternatively, the processor is configured to: determine, based on the paging indication information, a paging group that does not need to receive the paging message, and skip sending, on the corresponding paging occasion, the paging message to the paging group that does not need to receive the paging message.

In a possible design, the transceiver is configured to: send the paging indication information on a common control channel in a time window, or send the paging indication information on the first paging occasion, where the first paging occasion is in the time window.

In a possible design, the transceiver is configured to: send paging scheduling information, where the paging scheduling information includes the paging indication information, and the paging indication information includes a first indication value and a second indication value, the first indication value is used for indicating that the at least one paging group needs to receive the paging message, and the second indication value is used for indicating that the at least one paging group does not need to receive the paging message.

In a possible design, a field of the paging scheduling information includes at least one of the following, including a short message service message indication field, a short message service message field, a frequency domain scheduling indication field, a time domain data field, a virtual resource block-to-physical resource block (VRB-to-PRB) mapping standard field, a format adjusting field, and a transport block (TB) scale factor field.

In a possible design, the paging indication information further includes a paging group number corresponding to each paging group in the at least one paging group.

Based on the description of the foregoing content, in this application, when sending the paging message, the network device does not send the paging message based on the inherent correspondence between paging groups and paging occasions, but determines the paging occasion of the paging group based on the paging indication information, so that a correspondence between paging groups and paging occasions is relatively flexible, thereby reducing a delay in receiving the paging message by the paging group. Correspondingly, when receiving the paging message, the paging group does not receive the paging message based on the inherent correspondence between paging groups and paging occasions, but determines the paging occasion of the paging group based on the paging indication information, so that a correspondence between paging groups and paging occasions is relatively flexible, thereby reducing a delay in receiving the paging message by the paging group.

According to a seventh aspect, a paging message sending method is provided. The method includes a network device obtains a time domain position of a paging occasion in a time window based on a time domain position of a discovery reference signal (DRS), and the network device sends a paging message on the paging occasion. The network device may be a base station. The paging occasion in the time window may be the first paging occasion on which the base station sends the paging message to a paging group. Whether LBT is successfully performed in configured time domain is not determinate, LBT may be successfully performed with a delay, and the DRS is sent only when the LBT is successfully performed. Therefore, the first paging occasion may be determined based on the time domain position of the DRS sent by the base station. Correspondingly, the UE also needs to determine a time domain position of the first paging occasion based on the time domain position of the DRS, to reduce a blind detection amount of blind detection performed by the UE on the paging message, to reduce UE detection power consumption.

In a possible design, the DRS includes a synchronous signal (SS), a physical broadcast channel (PBCH), and a control message of remaining minimum system information (RMSI), and that a network device obtains a time domain position of a paging occasion in a time window based on time domain position information of a discovery reference signal (DRS) includes: If the control message of the RMSI occupies 1 symbol in time domain, the network device determines a symbol previous to symbols occupied by the SS or the PBCH as the time domain position of the paging occasion in the time window, or if the control message of the RMSI occupies 2 symbols in time domain, the network device determines a symbol next to the symbols occupied by the SS or the PBCH as the time domain position of the paging occasion in the time window. It may be understood that a position of the paging occasion in the time window is indicated by using the time domain position of the DRS or by using a default implicit method.

According to an eighth aspect, a paging message sending method is provided. The method includes a network device sends a discovery reference signal (DRS), where the DRS includes indication information, and the indication information is used for indicating a time domain position of a paging occasion in a time window, and the network device sends a paging message on the paging occasion. In other words, when LBT is successfully performed, the network device may indicate, in a DRS to be sent subsequently, the first paging occasion of receiving the paging message, so that a UE can determine time domain information of the first paging occasion based on the indication information, to reduce a blind detection amount of the paging message, thereby reducing UE detection power consumption.

In a possible design, the DRS includes a synchronous signal (SS), a physical broadcast channel (PBCH), and a control message of remaining minimum system information (RMSI). The PBCH or the control message of the RMSI includes the indication information.

According to a ninth aspect, a paging message receiving method is provided. The method includes a terminal device obtains a time domain position of a paging occasion in a time window based on a time domain position of a discovery reference signal (DRS), and the terminal device receives a paging message on the paging occasion. Refer to the beneficial effects described in the seventh aspect for beneficial effects herein. Details are not described herein again.

In a possible design, the DRS includes a synchronous signal (SS), a physical broadcast channel (PBCH), and a control message of remaining minimum system information (RMSI), and that a terminal device obtains a time domain position of a paging occasion in a time window based on a time domain position of a DRS includes: If the control message of the RMSI occupies 1 symbol in time domain, the terminal device determines a symbol previous to symbols occupied by the SS or the PBCH as the time domain position of the paging occasion in the time window, or if the control message of the RMSI occupies 2 symbols in time domain, the terminal device determines a symbol next to the symbols occupied by the SS or the PBCH as the time domain position of the paging occasion in the time window.

According to a tenth aspect, a paging message receiving method is provided. The method includes a terminal device receives a discovery reference signal (DRS), where the DRS includes indication information, and the indication information is used for indicating a time domain position of a paging occasion in a time window, and the terminal device receives a paging message on the paging occasion. Refer to the beneficial effects described in the seventh aspect for beneficial effects herein. Details are not described herein again.

In a possible design, the DRS includes a synchronous signal (SS), a physical broadcast channel (PBCH), and a control message of remaining minimum system information (RMSI). The PBCH or the control message of the RMSI includes the indication information.

According to an eleventh aspect, a paging indication information sending method is provided. The method includes a network device sends paging indication information, where the paging indication information is used for indicating whether at least one paging group needs to receive a paging message, and whether another paging occasion other than the first paging occasion offsets in time domain. Due to impact of LBT, the first paging occasion may be determined based on a time domain position of a DRS. To reduce a blind detection amount of a paging group corresponding to another paging occasion, an offset amount of the another paging occasion may be indicated in the paging indication information, to reduce the blind detection amount of receiving the paging message by another paging group, thereby reducing UE power consumption.

In a possible design, the paging indication information includes a first indication value and a second indication value, the first indication value is used for indicating that the another paging occasion other than the first paging occasion does not offset in time domain, and the second indication value is used for indicating that the another paging occasion other than the first paging occasion offsets in time domain. For example, the first indication value is 0, and the second indication value is 1.

In a possible design, the paging indication information includes an offset amount of the discovery reference signal (DRS). The DRS is sent only when LBT is successfully performed. The first paging message is sent on the first paging occasion after the DRS. The first paging occasion already offsets based on time domain information of the DRS. In this case, the offset amount of the another paging occasion other than the first paging occasion may be the same as the offset amount of the DRS.

According to a twelfth aspect, a paging indication information receiving method is provided. The method includes a terminal device receives paging indication information, where the paging indication information is used for indicating whether at least one paging group needs to receive a paging message, and whether another paging occasion other than the first paging occasion offsets in time domain. Refer to the eleventh aspect for beneficial effects herein. Details are not described herein again.

In a possible design, the paging indication information includes a first indication value or a second indication value, the first indication value is used for indicating that the another paging occasion other than the first paging occasion does not offset in time domain, and the second indication value is used for indicating that the another paging occasion other than the first paging occasion offsets in time domain.

In a possible design, the paging indication information includes an offset amount of the discovery reference signal (DRS).

According to a thirteenth aspect, a network device is provided, including a processing module, configured to obtain a time domain position of a paging occasion in a time window based on a time domain position of a discovery reference signal (DRS), and a communications module, configured to send a paging message on the paging occasion.

In a possible design, the DRS includes a synchronous signal (SS), a physical broadcast channel (PBCH), and a control message of remaining minimum system information (RMSI), the processing module is configured to: if the control message of the RMSI occupies 1 symbol in time domain, determine a symbol previous to symbols occupied by the SS or the PBCH as the time domain position of the paging occasion in the time window, or if the control message of the RMSI occupies 2 symbols in time domain, determine a symbol next to the symbols occupied by the SS or the PBCH as the time domain position of the paging occasion in the time window.

According to a fourteenth aspect, a network device is provided, including a communications module, configured to send a discovery reference signal (DRS), where the DRS includes indication information, and the indication information is used for indicating a time domain position of a paging occasion in a time window, and the network device sends a paging message on the paging occasion.

In a possible design, the DRS includes a synchronous signal (SS), a physical broadcast channel (PBCH), and a control message of remaining minimum system information (RMSI). The PBCH or the control message of the RMSI includes the indication information.

According to a fifteenth aspect, a terminal device is provided, including a processing module, configured to obtain a time domain position of a paging occasion in a time window based on a time domain position of a discovery reference signal (DRS), and a communications module, configured to receive a paging message on the paging occasion.

In a possible design, the DRS includes a synchronous signal (SS), a physical broadcast channel (PBCH), and a control message of remaining minimum system information (RMSI), the processing module is configured to: if the control message of the RMSI occupies 1 symbol in time domain, use a symbol previous to symbols occupied by the SS or the PBCH as the time domain position of the paging occasion in the time window, or if the control message of the RMSI occupies 2 symbols in time domain, use a symbol next to the symbols occupied by the SS or the PBCH as the time domain position of the paging occasion in the time window.

According to a sixteenth aspect, a terminal device is provided, including a receiving module, configured to receive a discovery reference signal (DRS), where the DRS includes indication information, and the indication information is used for indicating a time domain position of a paging occasion in a time window, and a processing module, configured to receive a paging message on the paging occasion.

In a possible design, the DRS includes a synchronous signal (SS), a physical broadcast channel (PBCH), and a control message of remaining minimum system information (RMSI). The PBCH or the control message of the RMSI includes the indication information.

According to a seventeenth aspect, a network device is provided, including a communications module, configured to send paging indication information, where the paging indication information is used for indicating whether at least one paging group needs to receive a paging message, and whether another paging occasion other than the first paging occasion offsets in time domain.

In a possible design, the paging indication information includes a first indication value and a second indication value, the first indication value is used for indicating that the another paging occasion other than the first paging occasion does not offset in time domain, and the second indication value is used for indicating that the another paging occasion other than the first paging occasion offsets in time domain.

In a possible design, the paging indication information includes an offset amount of the discovery reference signal (DRS).

According to an eighteenth aspect, a terminal device is provided, including a communications module, configured to receive paging indication information, where the paging indication information is used for indicating whether at least one paging group needs to receive a paging message, and whether another paging occasion other than the first paging occasion offsets in time domain.

In a possible design, the paging indication information includes a first indication value or a second indication value, the first indication value is used for indicating that the another paging occasion other than the first paging occasion does not offset in time domain, and the second indication value is used for indicating that the another paging occasion other than the first paging occasion offsets in time domain.

In a possible design, the paging indication information includes an offset amount of the discovery reference signal (DRS).

According to a nineteenth aspect, a network device is provided, including a processor, configured to obtain a time domain position of a paging occasion in a time window based on a time domain position of a discovery reference signal (DRS), and a transceiver, configured to send a paging message on the paging occasion.

In a possible design, the DRS includes a synchronous signal (SS), a physical broadcast channel (PBCH), and a control message of remaining minimum system information (RMSI), the processor is configured to: if the control message of the RMSI occupies 1 symbol in time domain, determine a symbol previous to symbols occupied by the SS or the PBCH as the time domain position of the paging occasion in the time window, or if the control message of the RMSI occupies 2 symbols in time domain, determine a symbol next to the symbols occupied by the SS or the PBCH as the time domain position of the paging occasion in the time window.

According to a twentieth aspect, a network device is provided, including a transceiver, configured to send a discovery reference signal (DRS), where the DRS includes indication information, and the indication information is used for indicating a time domain position of a paging occasion in a time window, and the network device sends a paging message on the paging occasion.

In a possible design, the DRS includes a synchronous signal (SS), a physical broadcast channel (PBCH), and a control message of remaining minimum system information (RMSI). The PBCH or the control message of the RMSI includes the indication information.

According to a twenty-first aspect, a terminal device is provided, including a processor, configured to obtain a time domain position of a paging occasion in a time window based on a time domain position of a discovery reference signal (DRS), and a transceiver, configured to receive a paging message on the paging occasion.

In a possible design, the DRS includes a synchronous signal (SS), a physical broadcast channel (PBCH), and a control message of remaining minimum system information (RMSI), the processor is configured to: if the control message of the RMSI occupies 1 symbol in time domain, use a symbol previous to symbols occupied by the SS or the PBCH as the time domain position of the paging occasion in the time window, or if the control message of the RMSI occupies 2 symbols in time domain, use a symbol next to the symbols occupied by the SS or the PBCH as the time domain position of the paging occasion in the time window.

According to a twenty-second aspect, a terminal device is provided, including a receiver, configured to receive a discovery reference signal (DRS), where the DRS includes indication information, and the indication information is used for indicating a time domain position of a paging occasion in a time window, and a processor, configured to receive a paging message on the paging occasion.

In a possible design, the DRS includes a synchronous signal (SS), a physical broadcast channel (PBCH), and a control message of remaining minimum system information (RMSI). The PBCH or the control message of the RMSI includes the indication information.

According to a twenty-third aspect, a network device is provided, including a transceiver, configured to send paging indication information, where the paging indication information is used for indicating whether at least one paging group needs to receive a paging message, and whether another paging occasion other than the first paging occasion offsets in time domain.

In a possible design, the paging indication information includes a first indication value and a second indication value, the first indication value is used for indicating that the another paging occasion other than the first paging occasion does not offset in time domain, and the second indication value is used for indicating that the another paging occasion other than the first paging occasion offsets in time domain.

In a possible design, the paging indication information includes an offset amount of the discovery reference signal (DRS).

According to a twenty-fourth aspect, a terminal device is provided, including a transceiver, configured to receive paging indication information, where the paging indication information is used for indicating whether at least one paging group needs to receive a paging message, and whether another paging occasion other than the first paging occasion offsets in time domain.

In a possible design, the paging indication information includes a first indication value or a second indication value, the first indication value is used for indicating that the another paging occasion other than the first paging occasion does not offset in time domain, and the second indication value is used for indicating that the another paging occasion other than the first paging occasion offsets in time domain.

In a possible design, the paging indication information includes an offset amount of the discovery reference signal (DRS).

According to a twenty-fifth aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the first aspect.

According to a twenty-sixth aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the second aspect.

According to a twenty-seventh aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the seventh aspect.

According to a twenty-eighth aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the eighth aspect.

According to a twenty-ninth aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the ninth aspect.

According to a thirtieth aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the tenth aspect.

According to a thirty-first aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the eleventh aspect.

According to a thirty-second aspect, an embodiment of this application provides a communications apparatus, where the communications apparatus includes one or more interface circuits and one or more processors, the interface circuit is configured to: receive a code instruction and transmit the code instruction to the processor, and the processor is configured to run the code instruction to perform the method according to the twelfth aspect.

According to a thirty-third aspect, an embodiment of this application provides a computer-readable storage medium, configured to store computer software instructions used by the foregoing terminal device and/or network device. When executed, the instructions enable the methods in the foregoing aspects to be implemented.

According to a thirty-fourth aspect, an embodiment of this application provides a computer program product including instructions. When the computer program product runs on a computer, the computer is enabled to perform the method according to any one of the foregoing aspects.

According to a thirty-fifth aspect, an embodiment of this application provides a communications system, including the terminal device and the network device in the foregoing aspects.

DETAILED DESCRIPTION OF ILLUSTRATIVE EMBODIMENTS

For ease of understanding, example descriptions of some concepts related to this application are provided for reference. Details are as follows:

Paging message: Generally, paging messages are classified into two types. One type is used for calling a terminal device, that is, a network device searches for the terminal device, to enable the terminal device to perform a random access process after receiving the paging message, and enter a connected state from an idle state, to perform data communication. For example, during a telephone call service, the network device sends a paging message to the terminal device. The other type is used for short message service message transmission. For example, short message service messages can be transmitted by an earthquake and tsunami warning system (ETWS) and a system information system to the terminal device.

Figure 1:
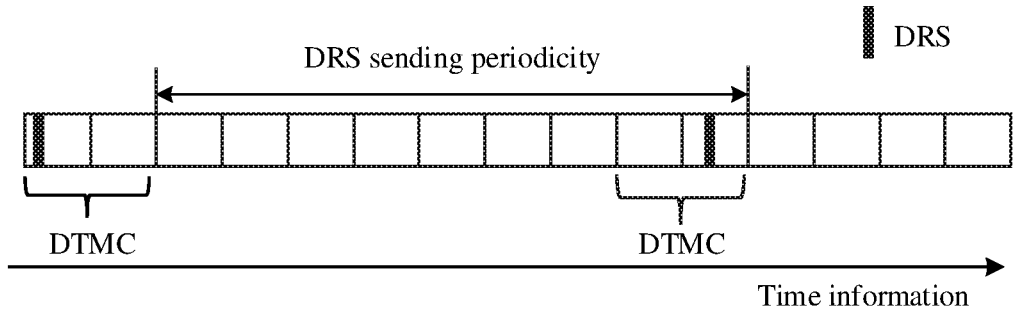
FIG. 1 is a schematic diagram of sending a DRS in a DTMC window.
Figure 2:
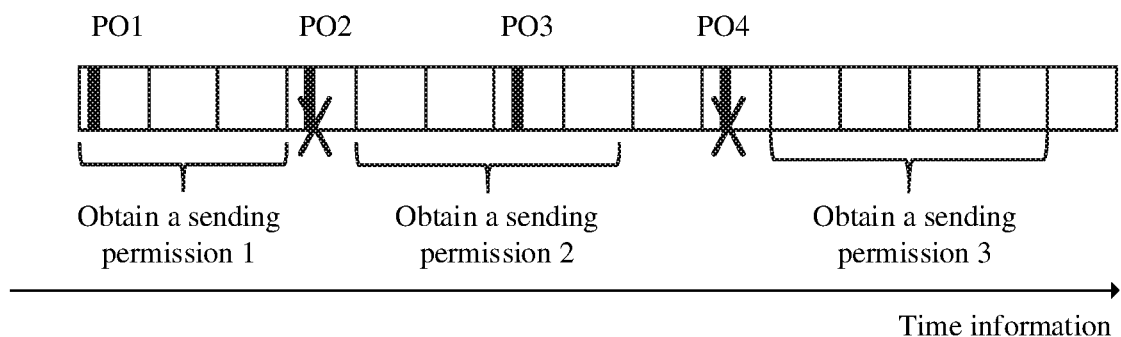
FIG. 2 is a schematic diagram showing that a paging message cannot be effectively sent to a terminal device.
Figure 3:
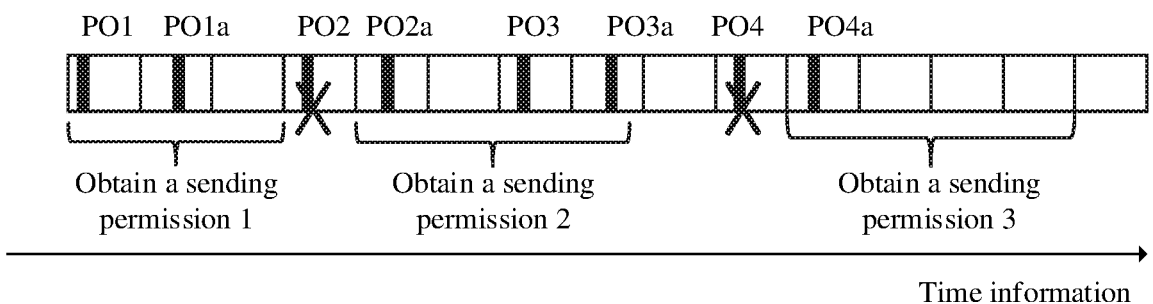
FIG. 3 is a schematic diagram of increasing opportunities of successfully sending a paging message by increasing paging opportunities.
Figure 4:
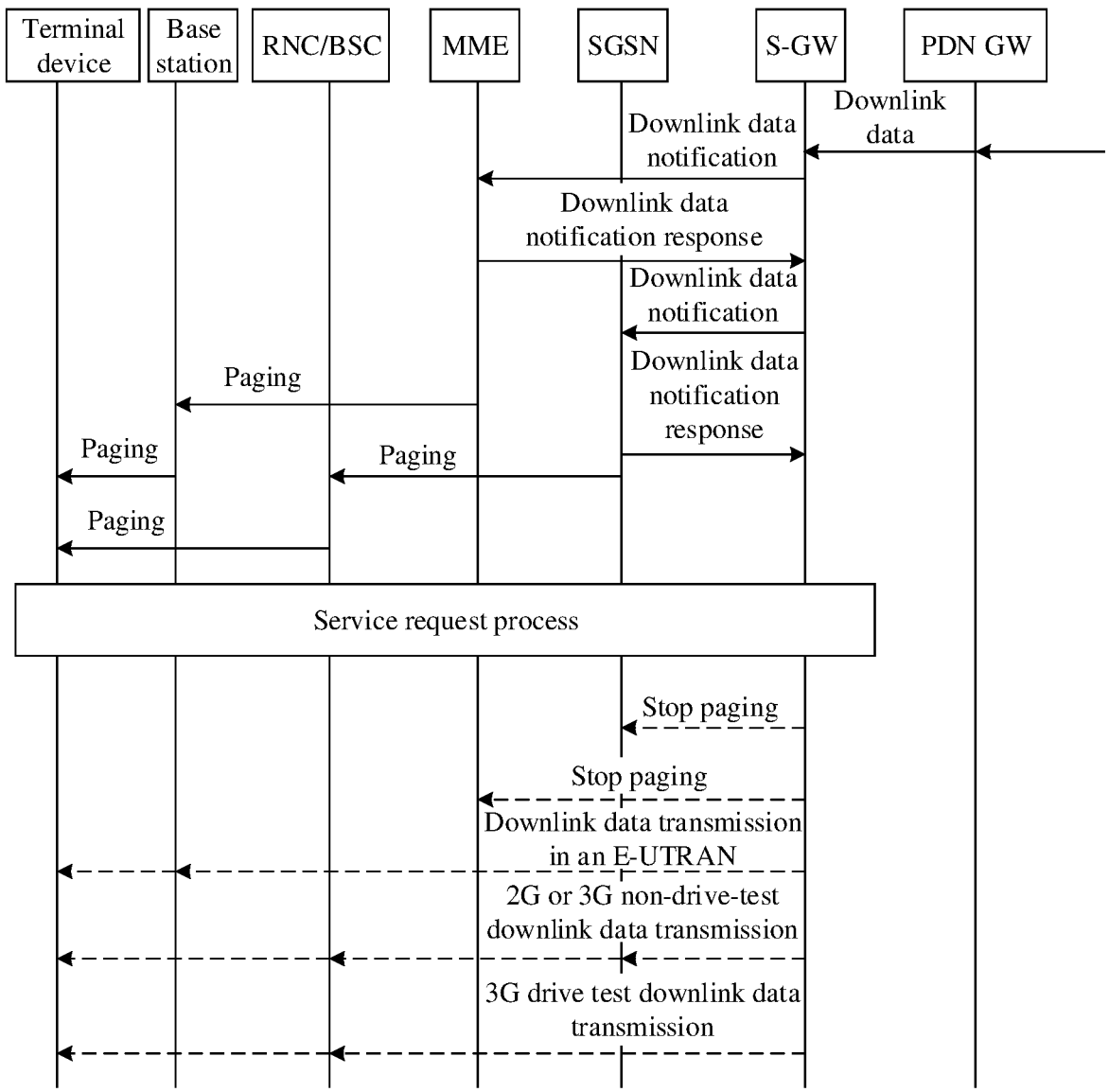
FIG. 4 is a schematic diagram of a process in which a network device sends a paging message to a terminal device in an radio resource control (RRC) idle state according to an embodiment of this application.

If the terminal device is in an idle state, a process in which the network device sends a paging message to the terminal device in a radio resource control (RRC)_IDLE state may be shown in FIG. 4. When downlink data reaches the terminal device, for example, when the terminal device performs a global two-way network paging system service (e-mail paging system service, EPS service), circuit switched fallback (CS fallback), and a short message service (SMS), the network device initiates paging to the terminal device. After receiving the paging message, the terminal device initiates a service request, and responds to the paging message of a core network. FIG. 4 shows a process in which a network triggers a service request.

Figure 5:
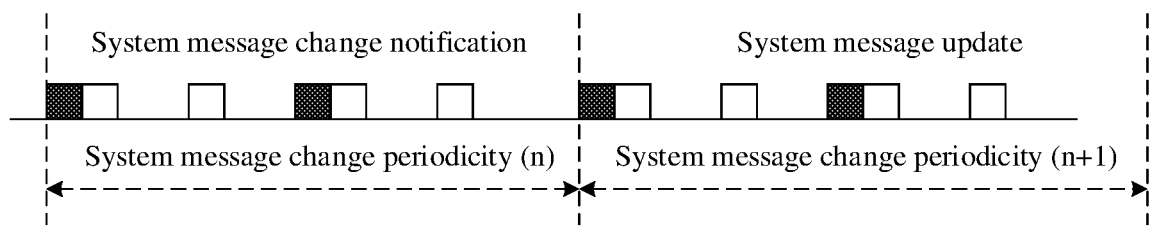
FIG. 5 is a schematic diagram of a notification process in which a paging message is of a type of a short message service message, and the short message service message is a system message change notification.

If the terminal device is in an RRC idle or RRC connected state, the network device may notify the terminal device of a change of a short message service message type in the following three cases: (1) System message change notification. As shown in FIG. 5, when an evolved universal terrestrial radio access network (E-UTRAN) needs to change a system message, each terminal device may be notified by using a paging message. After receiving the paging message of a type of the system message change notification in a system message change periodicity (for example, an $n^{th}$ periodicity), the terminal device knows to update the system message in a next system message change periodicity (for example, an $(n+1)^{th}$ periodicity). That is, system message update is performed (updated information). (2) ETWS primary notification message and/or ETWS secondary notification message. The ETWS is used for releasing emergency information such as earthquakes and tsunamis to the public in time and guiding the public to avoid danger and rescue themselves. The ETWS is a part of a public warning system (PWS). (3) Commercial mobile alert system (CMAS) information. To be specific, in cases such as interruption of television and broadcast signals and electricity after a disaster, the warning system can notify residents in time by using a short message service message. There are three types of warnings issued by the system: a disaster warning, which informs citizens of possible events that may affect their lives or endanger them, a child abduction warning, and a president's warning, which notifies any other possible emergency. This warning short message service message is initially sent in a form of text.

Figure 6:
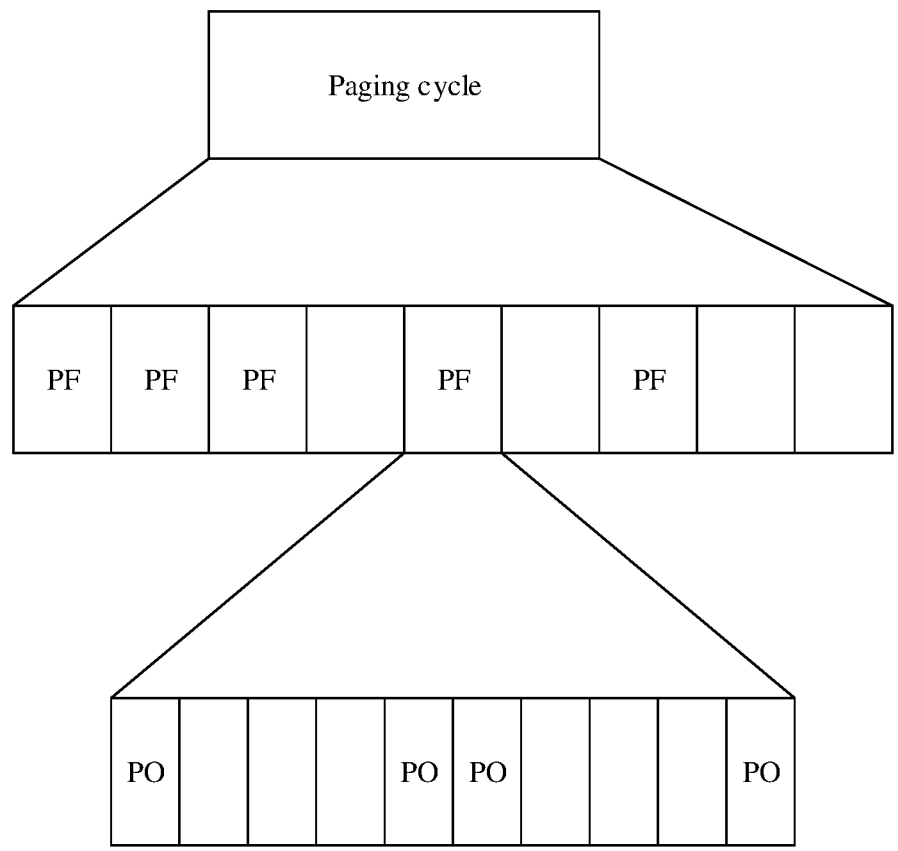
FIG. 6 is a schematic diagram of a relationship between paging frames and paging occasions in a paging cycle according to an embodiment of this application.

Paging occasion: A paging occasion (PO) described in the embodiments of this application indicates a moment at which a paging message is sent (for example, in a unit of a slot or a symbol) from the concept of time domain, and may be understood as sending control information or scheduling information of the paging message. Therefore, the PO may alternatively be understood as information about a time domain position at which a network device sends the scheduling information. In an idle state, a terminal device needs to cyclically receive a paging message, and this cycle is a paging cycle (T, which may alternatively be considered as a DRX cycle in the idle state). However, a specific paging occasion (PO) for reception is determined by the network device and the terminal device based on a protocol. The PO may alternatively be understood as one scheduling subframe, corresponding to one subframe number, and may be 1 ms in LTE. As shown in FIG. 6, in one paging cycle, there may be paging frames (PFs) corresponding to a plurality of radio frame numbers. There may be a plurality of POs (corresponding to a plurality of terminal devices, and each terminal device has only one PO in one paging cycle) in each paging frame. In an existing standard protocol, both the paging message for paging the terminal device and the message of a short message service message type are sent on the PO. When a specific PO currently arrives, if the paging message for paging the terminal device and the message of the short message service message type arrive separately, the network device sends the corresponding paging message or short message service message, or when both the two messages arrive, the network device simultaneously sends the two messages.

Figure 7:
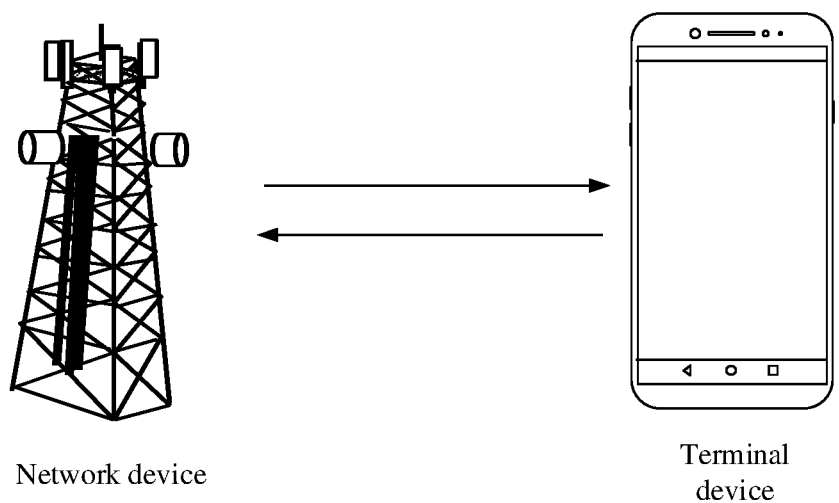
FIG. 7 is a schematic diagram of a system architecture according to an embodiment of this application.

Paging scheduling information: To receive the paging message, the network device needs to first detect and receive control information of the paging message, that is, receive the paging scheduling information. Main content fields of the paging scheduling information may be shown in Table 1.

shown in FIG. 7. The system architecture may include a network device and one or more terminal devices connected to the network device.

The network device may be a base station, and the base station may be a device that can communicate with the terminal device. The base station may alternatively be a relay node, a radio access point, or the like. The base station may be a base transceiver station (BTS) in a global system for mobile communications (GSM) or a code division multiple access (CDMA) network, or may be an NB (NodeB) in wideband code division multiple access (WCDMA), or may be an eNB or an eNodeB (evolved NodeB) in LTE. Alternatively, the base station may be a radio controller in a cloud radio access network (C-RAN) scenario. The base station may alternatively be a new base station (for example, a gNB) in a future 5G network or a network device in a future evolved public land mobile network (PLMN), or may be a wearable device, a vehicular device, or the like.

The terminal device may be referred to as user equipment (UE), a subscriber station (SS), a mobile station (MS),

TABLE 1

| Number | Bit Field | Bits | Remarks |
| --- | --- | --- | --- |
| 1 | Short message service message indication | 2 | 00: reserved<br>01: There is only a paging message.<br>10: There is only short message service message information.<br>11: There is not only a short message service message, but also a paging message. |
| 2 | Message | 8 | Defined by upper-layer (see the following Table 2), meaningful only when "number 1" is 10 or 11, and meaningless in other cases |
| 3 | Frequency domain scheduling indication | M | Meaningful only when "number 1" is 01 or 11, and meaningless in other cases |
| 4 | Time domain data | 4 | Meaningful only when "number 1" is 01 or 11, and meaningless in other cases |
| 5 | VRB-to-PRB mapping standard | 1 | Meaningful only when "number 1" is 01 or 11, and meaningless in other cases |
| 6 | Format adjusting | 5 | Meaningful only when "number 1" is 01 or 11, and meaningless in other cases |
| 7 | TB scale factor | 2 | Meaningful only when "number 1" is 01 or 11, and meaningless in other cases |
| 8 | Reserved bit | 6 | Reserved bit |

TABLE 2

| Bit | Short message service message content |
| --- | --- |
| 1 | System information modification indication (1 represents that system information changes)<br>If a bit value is 1, it indicates that a BCCH other than a SIB 6, a SIB 7, and a SIB 8 is modified. |
| 2 | ETW information indication<br>If the bit value is 1, it indicates an ETWS primary notification and/or an ETWS secondary notification and/or a CMAS notification. |
| 3 to 8 | Reserved |

The embodiments of this application may be used in a process in which the network device sends the paging message to the terminal device and the terminal device receives the paging message, so that impact that is on paging reception by the terminal device and that is caused by unsuccessful LBT in an unlicensed spectrum can be alleviated, and power consumption of the terminal device is not increased.

The technical solutions provided in the embodiments of this application may be applied to a system architecture customer premise equipment (CPE), an access terminal, a UE unit, a UE station, a mobile console, a remote station, a remote terminal, a UE terminal, a terminal, a wireless communications device, a UE agent, a UE apparatus, or the like. The access terminal may be a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a future 5G network, a terminal in a future evolved PLMN network, or the like.

Figure 8:
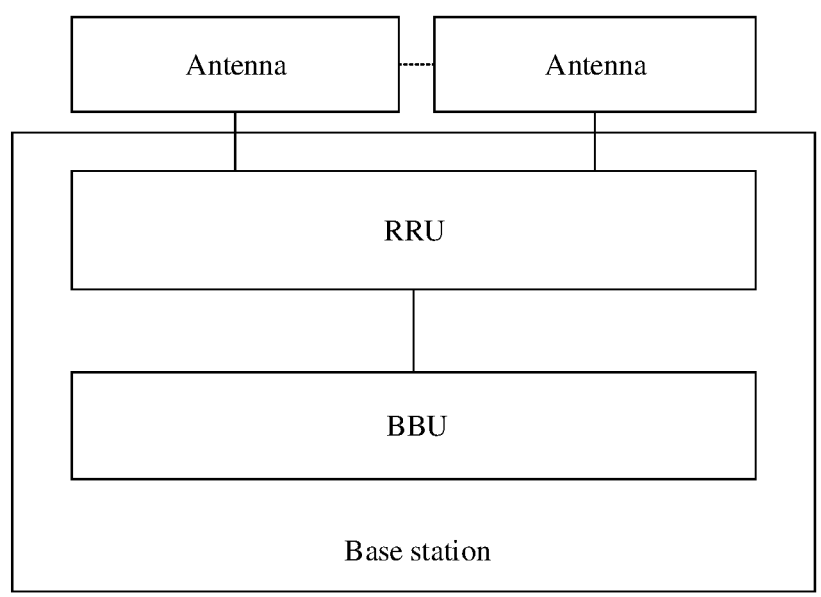
FIG. 8 is a schematic diagram of a structure of a base station according to an embodiment of this application.

In an example, the base station may be implemented by using a structure shown in FIG. 8. FIG. 8 shows a universal hardware architecture of a base station. The base station shown in FIG. 8 may include a building baseband unit (BBU) and a remote radio unit (RRU). The RRU is connected to an antenna system (namely, an antenna). The BBU and the RRU may be separately used as needed. It should be noted that, in a specific implementation process, the base station may also use another universal hardware architecture, and is not limited only to the universal hardware architecture shown in FIG. 9.

Figure 9:
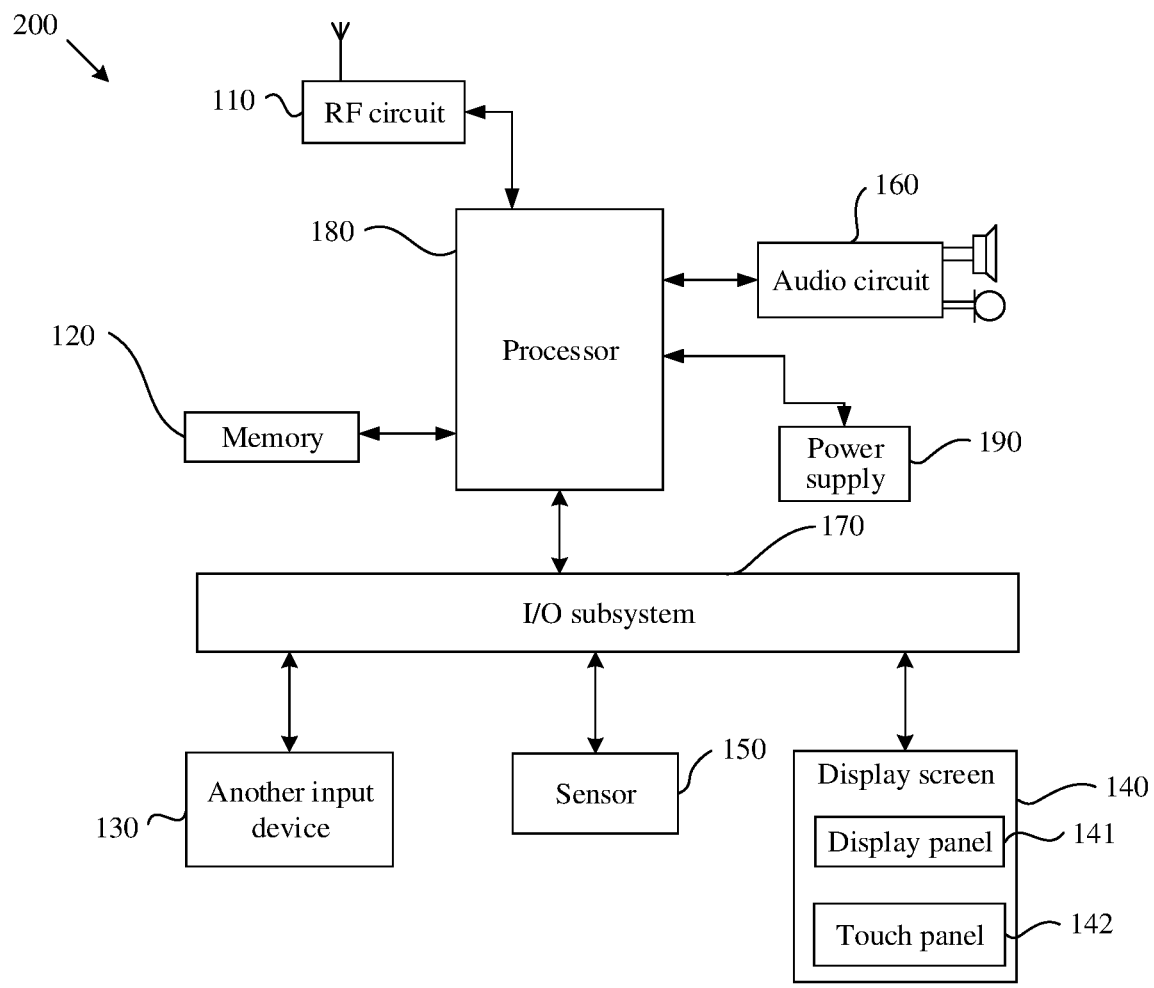
FIG. 9 is a schematic diagram of a structure of a terminal device, which is a mobile phone, according to an embodiment of this application.

In an example, a terminal device may be implemented by using a structure shown in FIG. 9. For example, a terminal device is a mobile phone, and FIG. 9 shows a general hardware architecture of the mobile phone for description. The mobile phone shown in FIG. 9 may include components such as a radio frequency (RF) circuit 110, a memory 120, another input device 130, a display 140, a sensor 150, an audio circuit 160, an I/O subsystem 170, a processor 180, and a power supply 190. A person skilled in the art may understand that a structure of the mobile phone shown in FIG. 9 does not constitute any limitation on the mobile phone, and may include more or fewer components than those shown in the figure, or some components may be combined, or some components may be split, or different component arrangements may be used. A person skilled in the art may understand that the display 140 is a user interface (user interface, UI), and the display 140 may include a display panel 141 and a touch panel 142. In addition, the mobile phone may include more or fewer components than those shown in the figure. Although not shown, the mobile phone may further include functional modules or components such as a camera and a Bluetooth module. Details are not described herein.

Further, the processor 180 is separately connected to the RF circuit 110, the memory 120, the audio circuit 160, the I/O subsystem 170, and the power supply 190. The I/O subsystem 170 is separately connected to the another input device 130, the display 140, and the sensor 150. The RF circuit 110 may be configured to receive and send a signal in information sending and receiving processes or a call process, and particularly, after receiving downlink information of the base station, send the downlink information to the processor 180 for processing. The memory 120 may be configured to store a software program and a module. By running the software program and the module stored in the memory 120, the processor 180 executes various function applications and data processing of the mobile phone. The another input device 130 may be configured to receive input digit or character information, and generate a key signal input related to user setting and function control of the mobile phone. The display 140 may be configured to display information entered by a user or information provided for a user and various menus of the mobile phone, and may further accept a user input. The sensor 150 may be an optical sensor, a motion sensor, or another sensor. The audio circuit 160 may provide an audio interface between the user and the mobile phone. The I/O subsystem 170 is configured to control an external input/output device, and the external device may include an input controller, a sensor controller, and a display controller of another device. The processor 180 is a control center of the mobile phone 200, connects the parts of the entire mobile phone by using various interfaces and lines, and executes various functions and processes data of the mobile phone 200 by running or executing the software program and/or the module stored in the memory 120 and invoking data stored in the memory 120, to perform overall monitoring on the mobile phone. The power source 190 (for example, a battery) is configured to supply power to each component. Preferably, the power source may be logically connected to the processor 180 by using a power source management system, to implement functions, such as charge management, discharge management, and power consumption management, by using the power source management system.

Based on the foregoing network architecture, this application provides a paging message sending method and a paging message receiving method. A correspondence between paging occasions and paging groups can be determined based on paging indication information, so that a flexible correspondence between paging occasions and paging groups is maintained. Further, generally, when a network device successfully performs LBT, a DRS is sent, then LBT is performed again, and a paging message is sent only when LBT is successfully performed again. However, in this application, the first paging group that needs to receive the paging message may be placed on a paging occasion in a DTMC, and the first paging message to be sent, paging indication information, and the DRS may be sent together. In one aspect, LBT actions performed again due to paging message transmission can be reduced, and a paging delay can be reduced. In a further aspect, when a paging message of a paging group in which a terminal device is located is in the DTMC, the terminal device receives the paging message and the paging indication message when woken up due to DRS reception in the DTMC, so that the terminal device can be prevented from being woken up again due to paging message reception, thereby reducing power consumption of the terminal device. When the paging message of the group in which the terminal device is located is not in the DTMC, when the terminal device determines, based on the paging indication, that there is no paging message to be received, the terminal device is no longer woken up, thereby reducing unnecessary power consumption.

Figure 10:
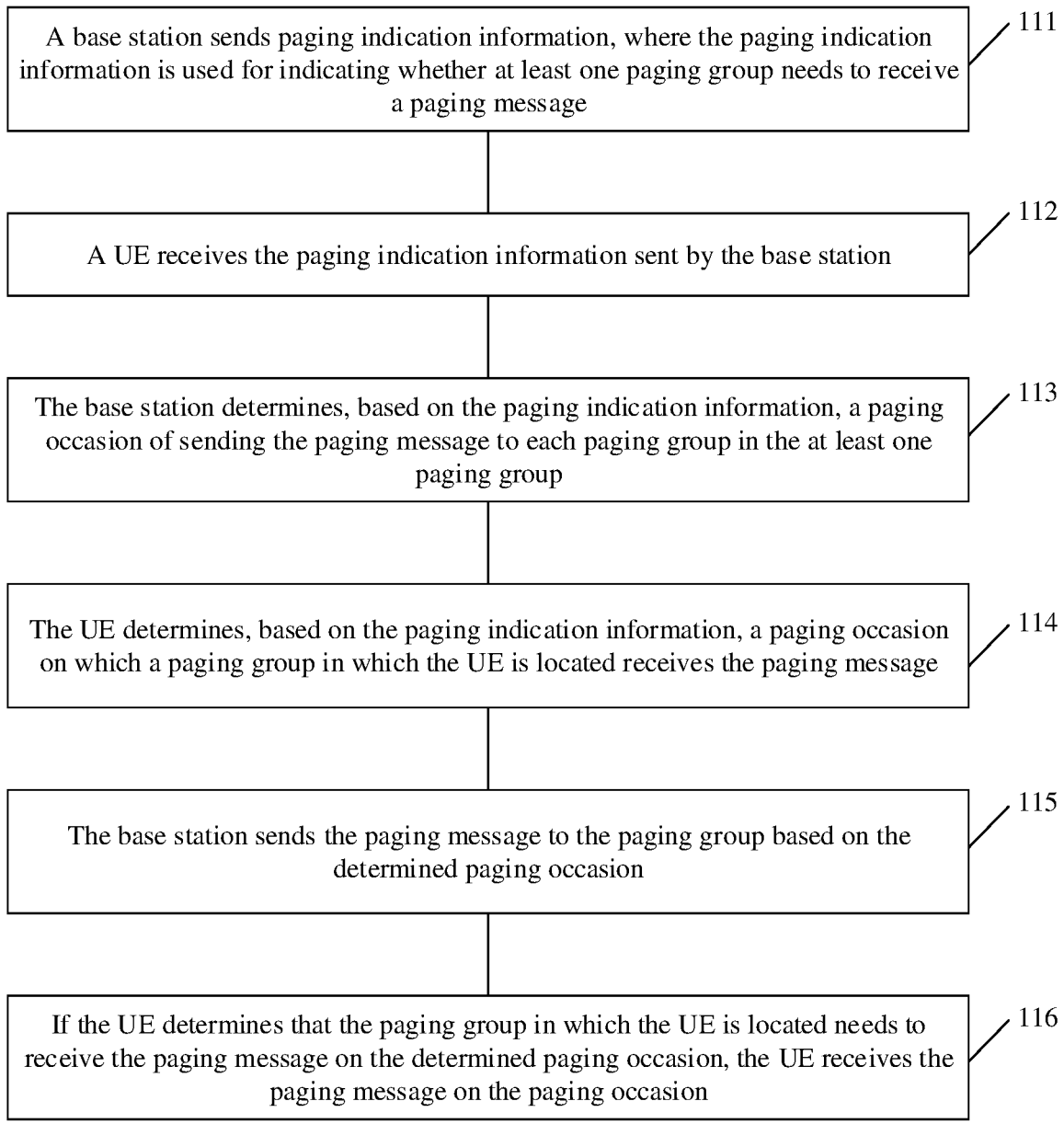
FIG. 10 is a schematic flowchart of a paging message sending and receiving method according to an embodiment of this application.

The following describes specific implementations of this application. Refer to FIG. 10. This application provides a paging message sending and receiving method. The method may be used in a process in which the base station pages the UE in FIG. 4. Using an example in which a network device is a base station and a terminal device is a UE, the method includes the following steps.

111. The base station sends paging indication information, where the paging indication information is used for indicating whether at least one paging group needs to receive a paging message.

Specifically, the base station may send the paging indication information in a time window. The time window may be a DTMC window. In the DTMC window, the base station may first send a DRS, and then send paging scheduling information immediately, or may send the paging scheduling information as a part of the DRS, where the paging scheduling information carries the paging indication information. The paging scheduling information may alternatively be understood as paging control channel information. The paging scheduling information is carried on the paging control channel, and is used for indicating, to the UE, a paging message to be sent by the base station. A paging group may be referred to as a UE group (UE group), and includes a plurality of UEs. A same paging group needs to receive, on a corresponding paging occasion, a same paging message sent by the base station.

In this embodiment of this application, that the base station sends the paging indication information in the time window may include the base station sends the paging indication information on a common control channel (CCCH) in the DTMC window, or that the base station sends the paging indication information in the time window may include the base station sends the paging indication information on the first paging occasion. Usually, the first paging occasion is located in the DTMC window, and when a paging message is sent on the first paging occasion, the base station not only needs to send the paging indication information on the first paging occasion, but also needs to send a paging message corresponding to a paging group on the first paging occasion. In this case, the first paging occasion may be understood as a common PO. To be specific, UEs in all paging groups need to receive the paging indication information on the common PO, and the paging group that receives the paging message on the common PO may also be referred to as a common paging group.

Figure 11:
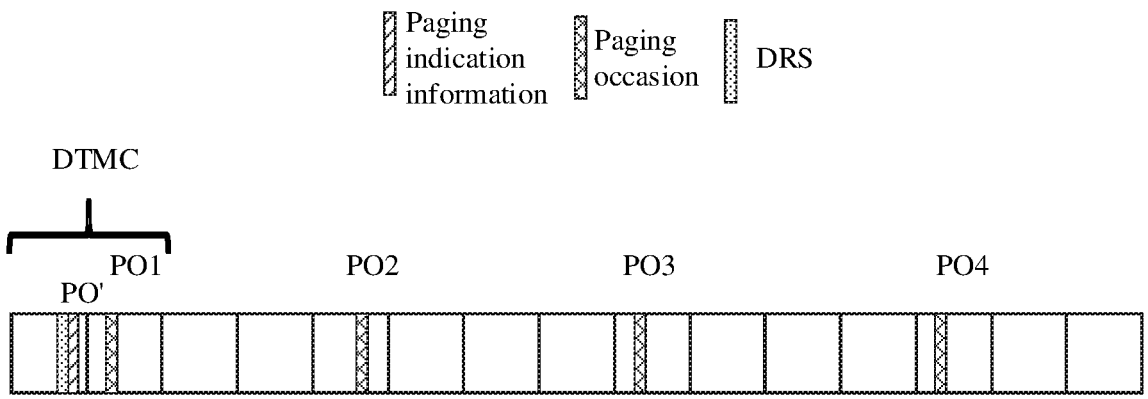
FIG. 11 is a schematic diagram of time domain positions of the first paging occasion PO1 and other POs in a DTMC window according to an embodiment of this application.

For example, if the base station sends the paging indication information on the common control channel, in the DTMC window, time domain positions of a sending occasion of the paging indication information, the first paging occasion PO1 in the DTMC window, and other POs may be shown in FIG. 11. It can be learned that, after sending the DRS in the DTMC window, the base station sends the paging indication information on a PO', and the UE may determine, based on the paging indication information received on the PO', a paging occasion of a paging group in which the UE is located (for example, the paging occasion is one of PO1 to PO4).

Figure 12:
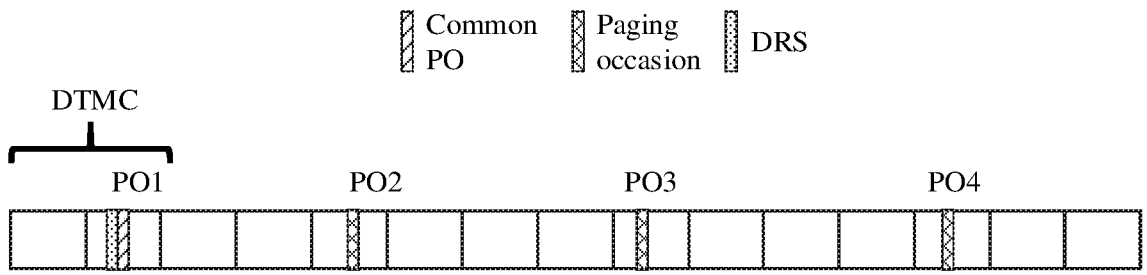
FIG. 12 is a schematic diagram of a time domain position of paging indication information sent by a base station on the first paging occasion and time domain positions of POs.

If the base station sends the paging indication information on the first paging occasion, time domain positions of the paging indication information and the POs may be shown in FIG. 12. It can be learned that the paging occasion PO1 in the DTMC window is used as a common PO, and the paging indication information and the first to-be-sent paging message may be transmitted on the PO1.

Regardless of which one of the foregoing manners is used for sending the paging indication information, a field of the paging indication information may be included in the paging scheduling information to be sent by the base station and sent. In the paging scheduling information, in a manner, an implicit indication method may be used for a correspondence between the paging indication information and paging groups.

In this implicit indication method, for example, the paging indication information in this application includes N bits, and each bit of the N bits corresponds to one paging group.

N is a quantity of the paging groups. The paging indication information includes a first indication value "1" and a second indication value "0". "1" indicates that a paging group corresponding to the bit needs to receive the paging message, and "0" indicates that the paging group corresponding to the bit does not need to receive the paging message. For example, there are four paging groups, and when a value of the field of the paging indication information is 0110, it indicates that a paging group 1 does not need to receive the paging message, a paging group 2 needs to receive the paging message, a paging group 3 needs to receive the paging message, and a paging group 4 does not need to receive the paging message.

In this way, it is assumed that there are four paging groups in total. Correspondingly, 4 bits of information need to be added to the paging scheduling information in Table 2 to indicate the paging indication information. Then, in this application, main content fields of the paging scheduling information may be shown in Table 3. In this application, content with a number 8 is added to the paging scheduling information, and in this case, N=4.

TABLE 3

| Number | Bit Field | Bits | Remarks |
| --- | --- | --- | --- |
| 1 | Short message service message indication | 2 | 00: reserved<br>01: There is only a paging message.<br>10: There is only short message service message information.<br>11: There is not only a short message service message, but also a paging message. |
| 2 | Message | 8 | Defined by upper-layer, meaningful only when "number 1" is 10 or 11, and meaningless in other cases |
| 3 | Frequency domain scheduling indication | M | Meaningful only when "number 1" is 01 or 11, and meaningless in other cases |
| 4 | Time domain data | 4 | Meaningful only when "number 1" is 01 or 11, and meaningless in other cases |
| 5 | VRB-to-PRB mapping standard | 1 | Meaningful only when "number 1" is 01 or 11, and meaningless in other cases |
| 6 | Format adjusting | 5 | Meaningful only when "number 1" is 01 or 11, and meaningless in other cases |
| 7 | TB scale factor | 2 | Meaningful only when "number 1" is 01 or 11, and meaningless in other cases |
| 8 | Paging indication information | N | N represents a quantity of paging groups, 0 represents that the paging message does not need to be received, and 1 represents that the paging message needs to be received,<br>see Table 4 (a paging indication information table) for a specific table of a meaning of each bit. |
| 9 | Reserved bit | 6 to N | Reserved bit |

TABLE 4

| Bit | Meaning |
| --- | --- |
| 1 | Paging indication of the paging group 1, where 0 represents that the paging message does not need to be received, and 1 represents that the paging message needs to be received. |
| 2 | Paging indication of the paging group 2, where 0 represents that the paging message does not need to be received, and 1 represents that the paging message needs to be received. |
| 3 | Paging indication of the paging group 3, where 0 represents that the paging message does not need to be received, and 1 represents that the paging message needs to be received. |

TABLE 4-continued

| Bit | Meaning |
|---|---|
| 4 | Paging indication of the paging group 4, where 0 represents that the paging message does not need to be received, and 1 represents that the paging message needs to be received. |

In another manner, the paging indication information may alternatively be indicated in the paging scheduling information in an explicit indication manner. In the explicit indication manner, the paging indication information not only includes bit values indicating whether the paging groups need to receive the paging message, but also is added with group number information, to enable paging group numbers to be in one-to-one correspondence with the bit values. For example, there are four paging groups, and the paging group numbers may be 1, 2, 3, and 4. Then, in the explicit manner, the correspondence between the paging group numbers and the bit values may be shown in Table 5.

TABLE 5

| Paging group number | 1 | 2 | 3 | 4 |
|---|---|---|---|---|
| Bit value | 0 | 1 | 0 | 1 |

When a paging group number is 1, it may be understood that a paging group number of the paging group 1 in this application is 1. Other paging groups are similar to the paging group 1. In some embodiments, the paging group numbers and the bits correspond to each other in sequence. For example, the paging group number 1 corresponds to the first bit value 0, the paging group number 2 corresponds to the second bit value 1, and so on. 112. The UE receives the paging indication information sent by the base station.

Corresponding to step 111, the UE may receive, on the common control channel in the DTMC window, the paging scheduling information sent by the base station in the DTMC window, or the UE receives the paging scheduling information sent by the base station on the first paging occasion. The paging scheduling information includes the paging indication information.

113. The base station determines, based on the paging indication information, a paging occasion of sending the paging message to each paging group in the at least one paging group.

A. In some embodiments, when the first paging group that needs to receive the paging message is determined, it may be determined that a paging occasion of the paging group and a paging occasion of a paging group after the paging group start from the first paging occasion.

In this case, specifically, the base station may determine a number m of the first paging group that needs to receive the paging message, and determine a number n of each paging group in the at least one paging group, and further determine that the paging occasion of sending the paging message to each paging group in the at least one paging group is n−m+1, where n and m are positive integers less than or equal to N, and n is greater than or equal to m.

In example 1, there are four paging groups: a paging group 1, a paging group 2, a paging group 3, and a paging group 4, and a sequence of paging group numbers is 1-2-3-4. If the four paging groups all need to receive the paging message, a sequence of receiving the paging message is the paging group 1-the paging group 2-the paging group 3-the paging group 4. If bit values corresponding to the paging group numbers in the paging indication information based on the sequence of the paging group numbers are 1XXX, where a value of X may be 0 or 1, that is, the number of the first paging group that needs to receive the paging message is 1, m herein is 1. The four paging groups correspond to four paging occasions. If a time domain sequence of the four paging occasions is PO1-PO2-PO3-PO4, in this case if n=1, that is, a number of a paging group in the at least one paging group is 1, the base station may determine that the paging occasion of sending the paging message to the paging group whose paging group number is 1 is 1, that is, the paging occasion of the paging group whose paging group number is 1 is the first paging occasion, or in other words, the paging occasion of the paging group 1 is the PO1. If n=2, that is, a number of a paging group in the at least one paging group is 2, the base station may determine that the paging occasion of sending the paging message to the paging group whose paging group number is 2 is 2, that is, the paging occasion of the paging group whose paging group number is 2 is the second paging occasion, or in other words, the paging occasion of the paging group 2 is the PO2. If n=3, that is, a number of a paging group in the at least one paging group is 3, the base station determines that the paging occasion of sending the paging message to the paging group whose paging group number is 3 is 3, that is, the paging occasion of the paging group whose paging group number is 3 is the third paging occasion, or in other words, the paging occasion of the paging group 3 is the PO3. Alternatively, if n=4, that is, a number of a paging group in the at least one paging group is 4, the base station determines that the paging occasion of sending the paging message to the paging group whose paging group number is 4 is 4, that is, the paging occasion of the paging group whose paging group number is 4 is the fourth paging occasion, or in other words, the paging occasion of the paging group 4 is the PO4.

Figure 13:
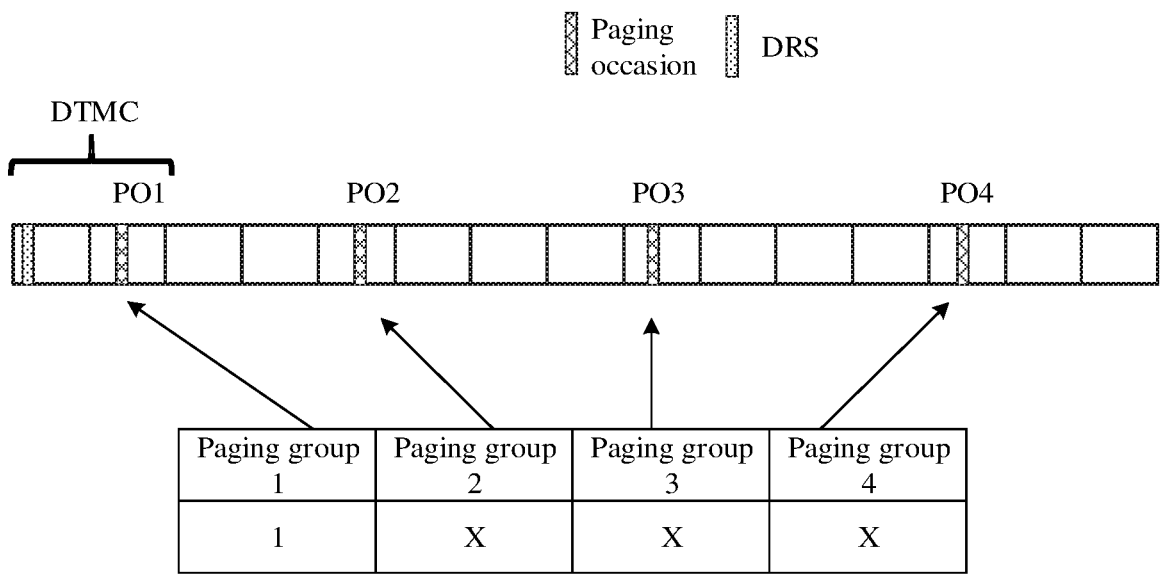
FIG. 13 is a schematic diagram of a correspondence between paging groups and paging occasions according to an embodiment of this application.

Based on example 1, it can be learned that, if the number of the first paging group that needs to receive the paging message is the paging group number 1, that is, the first paging group that needs to receive the paging message is the paging group 1, refer to FIG. 13 for paging occasions of the four paging groups determined by the base station, which are sequentially as follows. The paging occasion of the paging group 1 is the PO1, the paging occasion of the paging group 2 is the PO2, the paging occasion of the paging group 3 is the PO3, and the paging occasion of the paging group 4 is the PO4. To be specific, the four paging groups sequentially correspond to the first paging occasion to the fourth paging occasion based on the sequence of the paging group numbers.

In example 2, there are four paging groups, a sequence of paging group numbers is 1-2-3-4, and bit values corresponding to the paging group numbers in the paging indication information based on the sequence of the paging group numbers are 01XX, that is, the number of the first paging group that needs to receive the paging message is 2, m herein is 2. The four paging groups correspond to four paging occasions. If a time domain sequence of the four paging occasions is PO1-PO2-PO3-PO4, in this case if n=2, that is, a number of a paging group in the at least one paging group is 2, the base station may determine that a paging occasion of the paging group number 2 is 1 (PO1), that is, the paging occasion of the paging group whose paging group number is 2 is the first paging occasion. If n=3, that is, a number of a paging group in the at least one paging group is 3, the base station may determine that a paging occasion of the paging group number 3 is 2 (PO2), that is, the paging occasion of the paging group whose paging group number is 3 is the second paging occasion. Alternatively, if n=4, that is, a number of a paging group in the at least one paging group is 4, the base station determines that a paging occasion of the paging group number 4 is 3 (PO3), that is, the paging occasion of the paging group whose paging group number is 4 is the third paging occasion.

Figure 14:
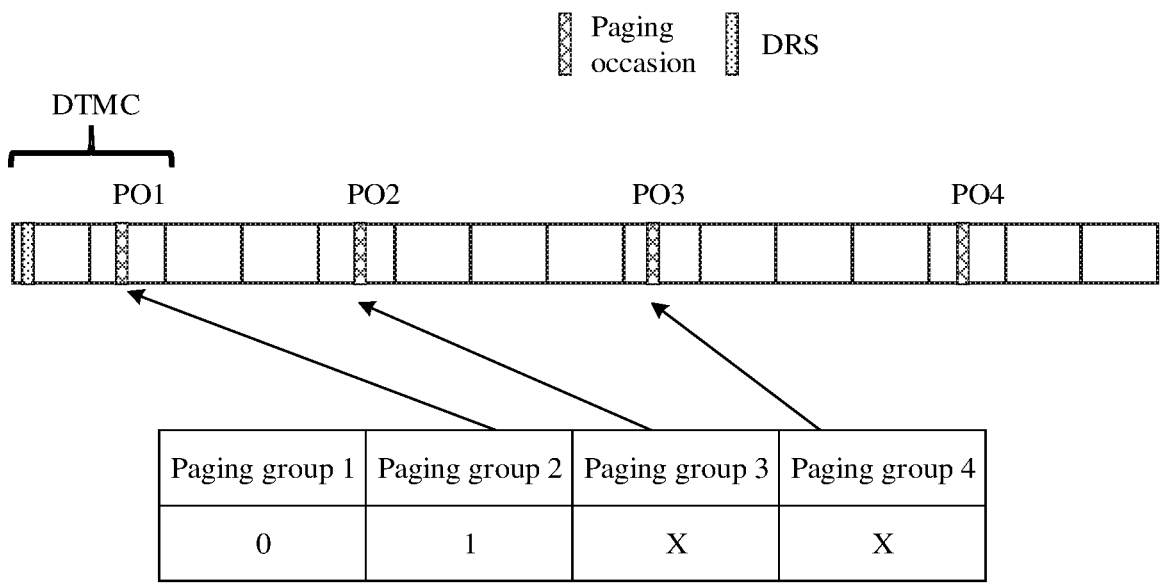
FIG. 14 is a schematic diagram of a correspondence between paging groups and paging occasions according to an embodiment of this application.

Based on example 2, it can be learned that, if the number of the first paging group that needs to receive the paging message is the paging group number 2, that is, the first paging group that needs to receive the paging message is the paging group 2, refer to FIG. 14 for paging occasions that are of three paging groups corresponding to the paging group number 2, the paging group number 3, and the paging group number 4 and that are determined by the base station, which are sequentially as follows. The paging occasion of the paging group 2 is the PO1, the paging occasion of the paging group 3 is the PO2, and the paging occasion of the paging group 4 is the PO3. To be specific, the three paging groups sequentially search for corresponding paging occasions starting from the first paging occasion based on the sequence of the paging group numbers.

Based on inference of example 2, if the number of the first paging group that needs to receive the paging message is the paging group number 3, that is, the first paging group that needs to receive the paging message is the paging group 3, the base station determines that paging occasions of two paging groups corresponding to the paging group number 3 and the paging group number 4 are sequentially as follows. The paging occasion of the paging group 3 is the PO1, and the paging occasion of the paging group 4 is the PO2. To be specific, the two paging groups sequentially search for corresponding paging occasions starting from the first paging occasion based on the sequence of the paging group numbers.

Based on example 1 and example 2, it can be obtained that, if bx represents a bit in the paging indication information, where x is a positive integer greater than or equal to 1:

(1) if b1=1, namely, a value of the first bit is 1, a paging occasion of a UE in the paging group 1 is the PO1, a paging occasion of a UE in the paging group 2 is the PO2, a paging occasion of a UE in the paging group 3 is the PO3, a paging occasion of a UE in the paging group 4 is the PO4, and the like.

(2) if b1=0, bx=1, where x is greater than 1, namely, the first bit whose value is 1 is not b1, starting from a paging group corresponding to bx, paging occasions of all subsequent paging groups are advanced, and the paging message starts to be received from the first paging occasion, a paging occasion of a UE in a paging group_x is the PO1, a paging occasion of a UE in a paging group_x+1 is the PO2, a paging occasion of a UE in a paging group_x+2 is the PO3, a paging occasion of a UE in a paging group_x+3 is the PO4, and the like.

It should be noted that, if the base station determines, based on the paging indication information, that the at least one paging group does not need to receive the paging message, the base station does not send the paging message to the paging group on the corresponding paging occasion. Alternatively, if the base station determines, based on the paging indication information, paging groups that do not need to receive the paging message, the base station does not send the paging message to the paging groups on the corresponding paging occasions. For example, if bx corresponding to the UE in the paging group_x+1 is 0, the base station does not send the paging message to the paging group_x+1 on the PO2.

B. In some other embodiments, the base station may determine that the first paging occasion on which the paging message needs to be received is 1, and the base station determines that a paging occasion of sending the paging message to each paging group in the at least one paging group except the first paging group that needs to receive the paging message is determined as each paging group number n, where n is a positive integer less than or equal to N.

In other words, the base station determines the paging occasion of the first paging group that needs to receive the paging message as the first paging occasion, that is, the first paging group that needs to receive the paging message corresponds to the paging occasion 1 (PO1). Except the first paging group that needs to receive the paging message, a paging occasion of a paging group n is a paging occasion n (POn). Because a correspondence between paging groups and paging occasions in an existing protocol is fixed, in this embodiment of this application, the base station determines only the paging occasion of the first paging group that has the paging message as the first paging occasion, and paging occasions of other paging groups remain unchanged.

For example, there are four paging groups, a sequence of paging group numbers is 1-2-3-4, bit values corresponding to the paging group numbers in the paging indication information based on the sequence of the paging group numbers are 01XX, and corresponding four paging occasions are the PO1, the PO2, the PO3, and the PO4. It can be learned that, the number of the first paging group that needs to receive the paging message is 2, and then the base station may determine that a paging occasion of the first paging group that needs to receive a paging message, namely, the paging group 2, is 1, the base station determines that a paging occasion of the paging group 3 is still 3, and the base station determines that a paging occasion of the paging group 4 is still 4. Because the paging group 1 before the paging group 2 does not need to receive the paging message, the base station may alternatively not need to determine a paging occasion of the paging group 1 before the paging group 2, and determines only paging occasions of paging groups starting from the paging group 2. In this example, referring to FIG. 15, the paging occasion of the paging group 2 is the PO1, the paging occasion of the paging group 3 is still the PO3, and the paging occasion of the paging group 4 is still the PO4.

114. The UE determines, based on the paging indication information, the paging occasion on which the paging group in which the UE is located receives the paging message.

Implementations of step 114 are similar to implementations of step 113. Based on the implementation A in step 113, after the UE receives the paging indication information, that the UE determines, based on the paging indication information, the paging occasion on which the paging group in which the UE is located receives the paging message may be that the UE determines a number m of the first paging group that needs to receive the paging message, determines a number n of the paging group in which the UE is located, and the UE determines that the paging occasion on which the paging group in which the UE is located receives the paging message is n-m+1, where n and m are positive integers less than or equal to N. To be specific, in this implementation, for the UE, when determining the paging occasion based on the paging indication information, the UE determines the paging occasion based on the number of the first paging group that needs to receive the paging message and the paging group number corresponding to the UE. Refer to examples 1 and 2 of the implementation A in step 112 for examples herein.

Based on the implementation B in step 113, after the UE receives the paging indication information, that the UE determines, based on the paging indication information, the paging occasion on which the paging group in which the UE is located receives the paging message may be that the UE determines a number m of the first paging group that needs to receive the paging message, determines a number n of the paging group in which the UE is located, if n=m, the UE determines that the paging occasion on which the paging group in which the UE is located receives the paging message is 1, or if n≠m, the UE determines that the paging occasion on which the paging group in which the UE is located receives the paging message is n, where n and m are positive integers less than or equal to N. In other words, if the paging group in which the UE is located in the first paging group that needs to the receive the paging message, the UE determines that the paging occasion on which the paging group in which the UE is located receives the paging message is the first paging occasion, or if the paging group in which the UE is located is not the first paging group that needs to receive the paging message, the paging occasion corresponding to the paging group in which the UE is located may be determined based on the correspondence between paging groups and paging occasions specified in the existing protocol, that is, the paging occasion corresponding to the paging group whose paging group number is n is a paging occasion n.

It should be noted that, if the UE determines, based on the paging indication information, that the paging group in which the UE is located does not need to receive the paging message, the UE skips determining the paging occasion, or skips receiving the paging message on the corresponding paging occasion.

In this way, when the paging group 1 does not need to receive the paging message, the paging occasion PO1 in the DTMC window can be prevented from being wasted, to reduce a paging delay.

If the base station indicates, in the paging indication information, that there is no paging message to be sent to each paging group, to be specific, bit values of the field of the paging indication information are all 0, the base station does not send the paging message on subsequent POs, and a UE of each paging group naturally determines, based on the paging indication information, that there is no paging message to be received, and each paging group does not receive the paging message. If the paging indication information indicates that there is at least one paging message to be sent, the following steps may continue to be performed.

115. The base station sends the paging message to the paging group based on the determined paging occasion.

The base station may send the paging message to each paging group based on the paging occasion of each paging group determined in step 113.

116. If the UE determines that the paging group in which the UE is located needs to receive the paging message on the determined paging occasion, the UE receives the paging message on the paging occasion.

Based on example 1 in the implementation A in step 113, referring to FIG. 14, if the UE can parse out, based on the paging indication information, that the paging group in which the UE is located is the first paging group, namely, the paging group 1, that needs to receive the paging message, the UE receives, on the PO1 in the DTMC window, the paging message that the paging group 1 needs to receive, or if the first paging group that needs to receive the paging message is the paging group 1, and the paging group in which the UE is located is one of the paging group 2, the paging group 3, or the paging group 4, for example, the paging group in which the UE is located is the paging group 3, if the paging group 3 in which the UE is located needs to receive the paging message, the UE receives the paging message on the PO3, or if the paging group 3 in which the UE is located does not need to receive the paging message, the UE does not detect the paging message on the PO3.

Figure 15:
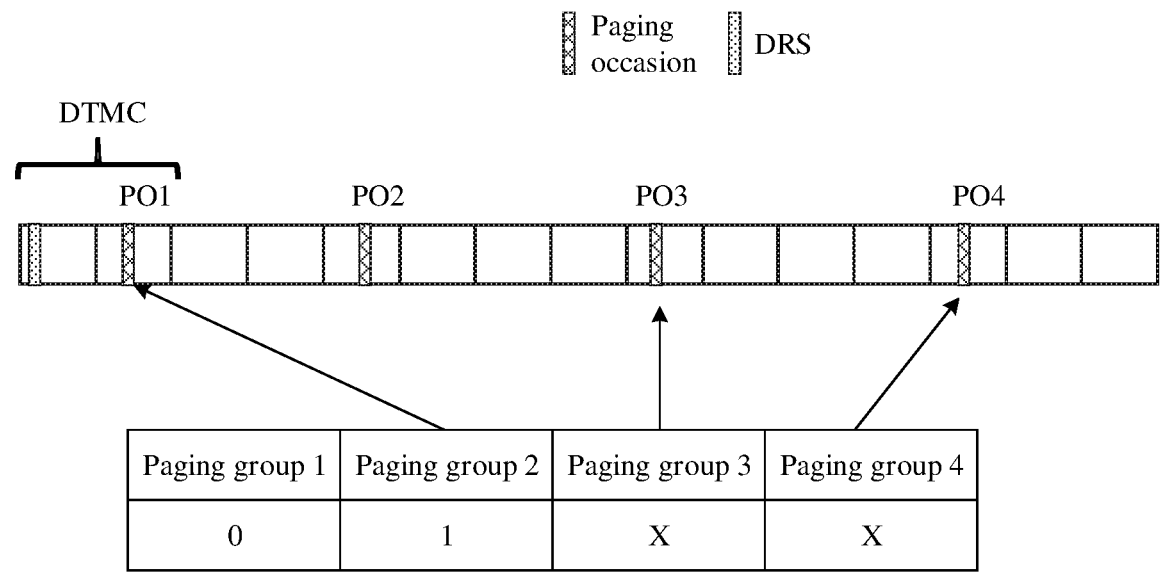
FIG. 15 is a schematic diagram of a correspondence between paging groups and paging occasions according to an embodiment of this application.

Based on example 2 in the implementation A in step 113, referring to FIG. 15, if the paging group in which the UE is located is the first paging group, namely, the paging group 2, that needs to receive the paging message, the UE receives the paging message on the PO1 in the DTMC window, or if the paging group in which the UE is located is after the paging group 2, for example, the paging group in which the UE is located is the paging group 3, if the paging group 3 in which the UE is located needs to receive the paging message, the UE receives the paging message on the PO2, or if the paging group 3 in which the UE is located does not need to receive the paging message, the UE does not detect the paging message on the PO2.

Based on the example in the implementation B in step 113, referring to FIG. 15, if the paging group in which the UE is located is the first paging group, namely, the paging group 2, that needs to receive the paging message, the UE receives the paging message on the PO1 in the DTMC window, or if the paging group in which the UE is located is after the paging group 2, for example, the paging group in which the UE is located is the paging group 3, the UE receives the paging message on the paging occasion PO3 as specified in the protocol, or does not detect the paging message.

In this way, based on the method for determining the paging occasion based on the paging indication information in this application, a flexible correspondence between paging occasions and paging groups can be kept, so that the paging delay can be reduced to some extent. Further, overheads of information bits can be reduced in a manner of implicitly indicating, in the paging indication information, whether there is a paging message.

In addition, in this embodiment of this application, if the paging indication information is indicated in an implicit manner, the paging indication information may alternatively be represented by using an existing information element in the paging scheduling information.

In other words, the paging indication information is carried in bits of at least one of fields of the paging scheduling information. Based on description of Table 3, the fields of the paging scheduling information include a short message service message indication field, a short message service message field, a frequency domain scheduling indication field, a time domain data field, a virtual resource block-to-physical resource block (virtual resource block-to-physical resource block, VRB-to-PRB) mapping standard field, a format adjusting field, and a transport block (transport block, TB) scale factor field.

In this implicit manner, the following cases exist:

In case 1, none of paging groups need to receive the paging message. That is, none of the paging groups need to receive the paging message. In this case, the field 00 in the short message service message indication in Table 3 may be redefined as that none of the paging groups need to receive the paging message. This includes that the short message service message and the paging message do not need to be received.

In case 2, the common paging group only needs to receive the short message service message. To be specific, the paging group corresponding to the PO in the DTMC only needs to receive the short message service message. In this case, the fields numbered 3, 4, 5, 6, and 7 in Table 3 are all meaningless, and one or more fields may be selected from these fields to represent the paging indication information. For example, bit values of the field numbered 4: the time domain data field may be used for indicating that there is no paging message to be sent.

In case 3, the common paging group only needs to receive the paging message. To be specific, the paging group corresponding to the PO in the DTMC only needs to receive the paging message.

In this case, the short message service message field numbered 2 is meaningless, and bits in the short message service message field may be used for carrying the paging indication information.

In case 4, the common paging group needs to receive not only the short message service message but also the paging message. To be specific, the paging group corresponding to the PO in the DTMC needs to receive not only the paging message but also the short message service message.

In this case, the paging scheduling information may not be modified, and each paging group still attempts to receive the paging message based on the originally corresponding paging occasion.

In conclusion, content of main fields of the paging scheduling information may be shown in Table 6.

TABLE 6

| Number | Bit Field | Bits | Remarks |
|---|---|---|---|
| 1 | Short message service message indication | 2 | 00: None of paging groups have a paging message.<br>01: There is only a paging message.<br>10: There is only short message service message information.<br>11: There is not only a short message service message, but also a paging message. |
| 2 | Message | 8 | When "number 1" is 10 or 11, interpret based on the protocol (Table 2)<br>When "number 1" is 01, parse based on "Table 4 Paging Indication Information" |
| 3 | Frequency domain scheduling indication | M | Meaningful only when "number 1" is 01 or 11, and meaningless in other cases |
| 4 | Time domain data | 4 | Meaningful only when "number 1" is 01 or 11, when "number 1" is 10, parse based on "Table 4 Paging Indication Information" |
| 5 | VRB-to-PRB mapping standard | 1 | Meaningful only when "number 1" is 01 or 11, and meaningless in other cases |
| 6 | Format adjusting | 5 | Meaningful only when "number 1" is 01 or 11, and meaningless in other cases |
| 7 | TB scale factor | 2 | Meaningful only when "number 1" is 01 or 11, and meaningless in other cases |
| 9 | Reserved bit | 6 | Reserved bit |

It has been mentioned in the foregoing process that, the paging indication information may be sent as a part of the DRS. In other words, the paging scheduling information is sent as a part of the DRS. The DRS herein may specifically include a synchronous signal (synchronous signal, SS), a physical broadcast channel (physical broadcast channel, PBCH), or a control message of remaining minimum system information (remaining minimum system information, RMSI). For example, the paging indication information is included in the control message for scheduling the RMSI, that is, in downlink control information (downlink control information, DCI) scrambled by using a system information-radio network temporary identity (system information-radio network temporary identity, SI-RNTI) as cyclic redundancy check (cyclic redundancy check, CRC).

Whether LBT is successfully performed in configured time domain is not determinate, LBT may be successfully performed with a delay, and the DRS is sent only when the LBT is successfully performed. Therefore, the first paging occasion on which the base station sends the paging message to a paging group may be determined based on the time domain position of the DRS sent by the base station. Correspondingly, the UE also needs to determine a time domain position of the first paging occasion based on the time domain position of the DRS, to reduce a blind detection amount of blind detection performed by the UE on the paging message, to reduce UE detection power consumption.

Therefore, an embodiment of this application provides a paging message sending method. Using an example in which a network device is a base station and a terminal device is a UE, referring to FIG. 16, the method includes the following steps.

171. The base station obtains a time domain position of a paging occasion in a time window based on a time domain position of a discovery reference signal (DRS).

In some embodiments, if a control message of RMSI occupies 1 symbol in time domain, the network device determines a symbol previous to symbols occupied by an SS or a PBCH as the time domain position of the paging occasion in the time window, or if the control message of the RMSI occupies 2 symbols in time domain, the network device determines a symbol next to the symbols occupied by the SS or the PBCH as the time domain position of the paging occasion in the time window.

Figure 17:
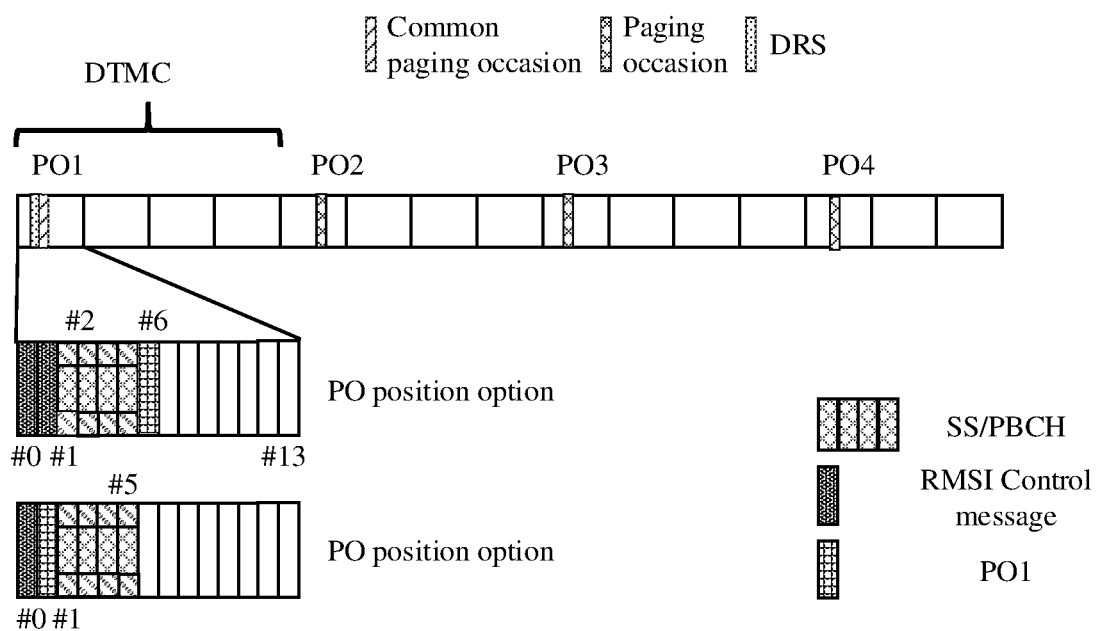
FIG. 17 is a schematic diagram of a time domain position of a DRS and time domain positions of paging occasions according to an embodiment of this application.

Refer to FIG. 17. When the control message of the RMSI occupies 1 symbol (a symbol 0) in the DRS, a symbol occupied by a paging occasion PO1 in a DTMC window may be a symbol previous to symbols occupied by the SS/PBCH in the DRS, for example, a symbol 1 in FIG. 17, or when the control message of the RMSI occupies 2 symbols (a symbol 0 and a symbol 1) in the DRS, the symbol occupied by the paging occasion PO1 in the DTMC window is a symbol next to the symbols occupied by the SS/PBCH in the DRS, for example, a symbol 6 in FIG. 17.

A quantity of symbols occupied by the control message of the RMSI is configured by a system or indicated by the SS/PBCH, and a UE side may calculate a position of the PO1 in the DTMC window after detecting a position of the SS/PBCH by using the quantity of symbols occupied by the control message of the RMSI and by using an indication of the SS/PBCH.

The PO1 placed in the DTMC window and the RMSI/SS/PBCH may occupy different time domain positions, or may occupy different frequency domain positions. For example, when a sub-carrier spacing (sub-carrier spacing, SCS) of the SS/PBCH is 15 kHz, the PO1 in the DTMC window and the RMSI/PBCH occupy different time domain positions, or when the sub-carrier spacing of the SS/PBCH is 30 kHz, the PO1 and the RMSI/SS/PBCH occupy different frequency domain positions.

172. The base station sends a paging message on the paging occasion.

In this way, the position of the paging occasion in the time window is obtained by using the time domain position of the DRS. Therefore, if paging scheduling information is sent on the paging occasion in the time window as a part of the DRS, an amount of blind detection performed by the UE on the paging scheduling information due to indeterminacy of LBT can be reduced, thereby reducing UE detection power consumption.

Figure 16:
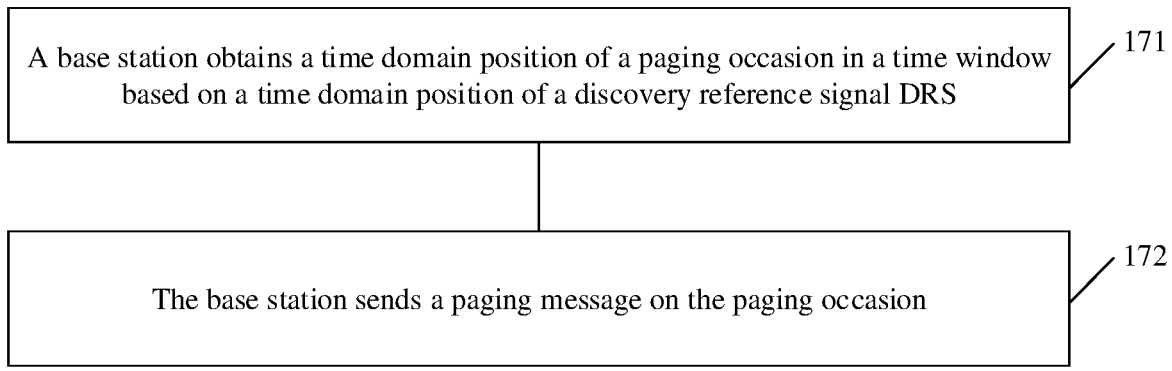
FIG. 16 is a schematic flowchart of a paging message sending method according to an embodiment of this application.
Figure 18:
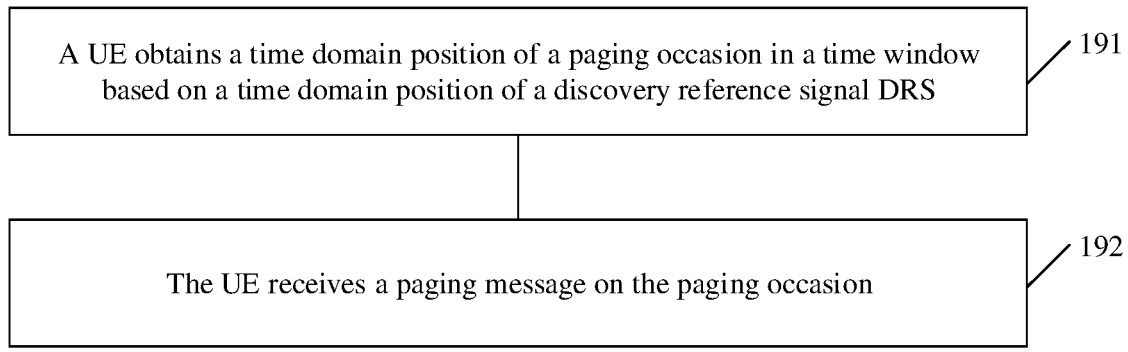
FIG. 18 is a schematic flowchart of a paging message receiving method according to an embodiment of this application.

Corresponding to FIG. 16, an embodiment of this application further provides a paging message receiving method. Using an example in which a network device is a base station and a terminal device is a UE, referring to FIG. 18, the method includes the following steps.

191. The UE obtains a time domain position of a paging occasion in a time window based on a time domain position of a discovery reference signal (DRS).

Refer to step 171 for an implementation of step 191. Details are not described herein again.

192. The UE receives a paging message on the paging occasion.

Figure 19:
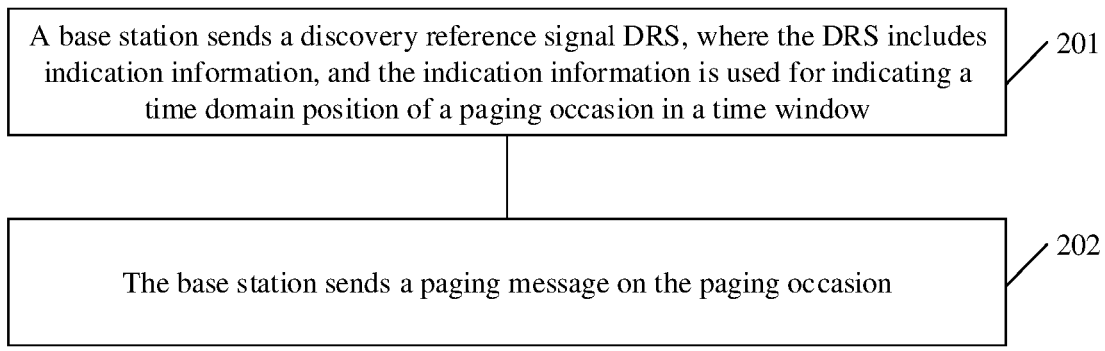
FIG. 19 is a schematic flowchart of a paging message sending method according to an embodiment of this application.

In this embodiment, that the UE receives the paging message includes a process in which the UE parses paging control information or paging scheduling information, detects the paging message on a control channel, and receives data of the paging message based on the paging control information. An embodiment of this application further provides a paging message sending method. Using an example in which a network device is a base station and a terminal device is a UE, referring to FIG. 19, the method includes the following steps.

201. The base station sends a discovery reference signal (DRS), where the DRS includes indication information, and the indication information is used for indicating a time domain position of a paging occasion in a time window.

Figures 20, 21:
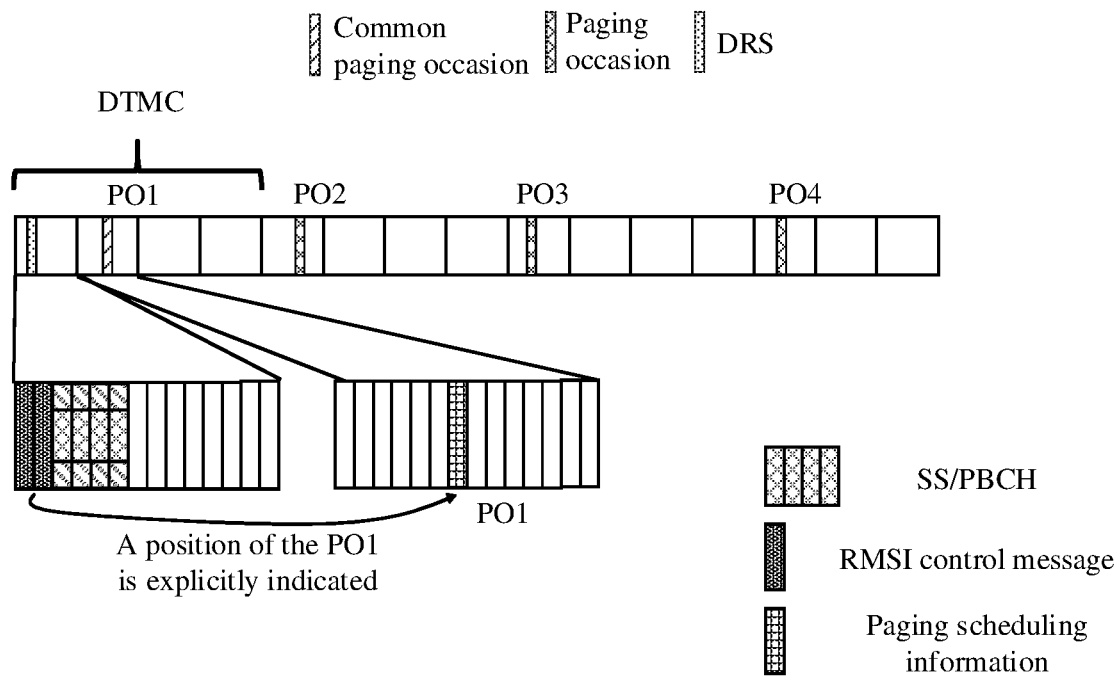
FIG. 20 is a schematic diagram used for indicating a time domain position of a paging occasion in a time window according to an embodiment of this application.
FIG. 21 is a schematic flowchart of a paging message receiving method according to an embodiment of this application.

Because the DRS includes an SS, a PBCH, and a control message of RMSI, as shown in FIG. 20, the PBCH or the control message of the RMSI may include the indication information. To be specific, the base station may indicate, in the PBCH or the control message of the RMSI, a time domain position of a PO1 in a DTMC window.

202. The base station sends a paging message on the paging occasion.

In other words, when LBT is successfully performed, the network device may indicate, in the PBCH or the control message of the RMSI to be sent subsequently, the time domain position of the first paging occasion PO1, so that the UE can determine time domain information of the first paging occasion based on the indication information, to reduce a blind detection amount of detection of the paging message by the UE, and also reduce UE detection power consumption.

An embodiment of this application further provides a paging message receiving method. Using an example in which a network device is a base station and a terminal device is a UE, referring to FIG. 21, the method includes the following steps.

221. The UE receives a discovery reference signal (DRS), where the DRS includes indication information, and the indication information is used for indicating a time domain position of a paging occasion in a time window.

Refer to step 201 for an implementation of step 221. Details are not described herein again.

222. The UE receives a paging message on the paging occasion.

Due to impact of LBT, the first paging occasion may be determined based on a time domain position of the DRS. The base station cannot send the paging message based on an expected time point on another PO other than the first paging occasion. Therefore, to reduce a blind detection amount of a paging group corresponding to the another paging occasion, whether the another paging occasion offsets may also be indicated in paging indication information, to reduce a blind detection amount of receiving the paging message by another paging group, thereby reducing UE power consumption.

Figure 22:
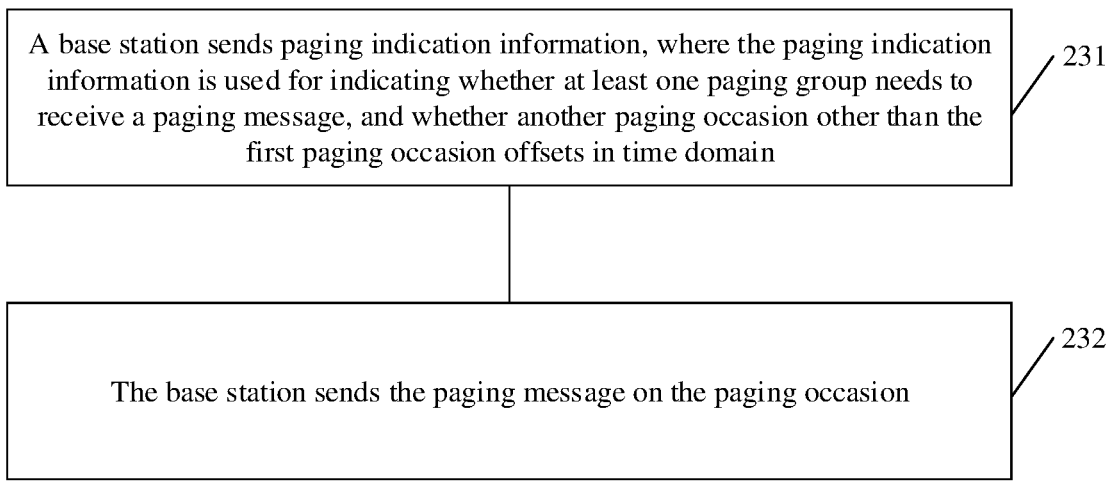
FIG. 22 is a schematic flowchart of a paging indication information sending method according to an embodiment of this application.

Therefore, an embodiment of this application further provides a paging indication information sending method. Using an example in which a network device is a base station and a terminal device is a UE, referring to FIG. 22, the method includes the following steps.

231. The base station sends paging indication information, where the paging indication information is used for indicating whether at least one paging group needs to receive a paging message, and whether another paging occasion other than the first paging occasion offsets in time domain.

That the paging indication information is used for indicating whether the at least one paging group needs to receive the paging message is already described in the foregoing embodiments. In this embodiment, in terms of the paging indication information being used for indicating whether the another paging occasion other than the first paging occasion offsets in time domain, in some embodiments, 1 bit may be added to the paging indication information. The 1 bit indicates the foregoing offset amount. A value of the 1 bit may be a third indication value or a fourth indication value. The third indication value is used for indicating that the another paging occasion other than the first paging occasion does not offset in time domain, and the fourth indication value is used for indicating that the another paging occasion other than the first paging occasion offsets in time domain. For example, the third indication value is 0, and the fourth indication value is 1.

In some embodiments, the paging indication information includes an offset amount of a DRS. It may be understood that, the DRS is sent only when LBT is successfully performed. The first paging message is sent on the first paging occasion after the DRS. The first paging occasion already offsets based on time domain information of the DRS. In this case, the offset amount of the another paging occasion other than the first paging occasion may be the same as the offset amount of the DRS. This offset amount may be a value, a time window, or the like. If the base station sends the paging message based on an expected PO, a value of the offset amount may be 0, or if the base station wants to delay sending the paging message, the value of the offset amount may be a value or a time window. In this way, the UE can receive the paging message more precisely, so that power consumption of detecting the paging message by the UE is reduced.

232. The base station sends the paging message on the paging occasion.

Figure 23:
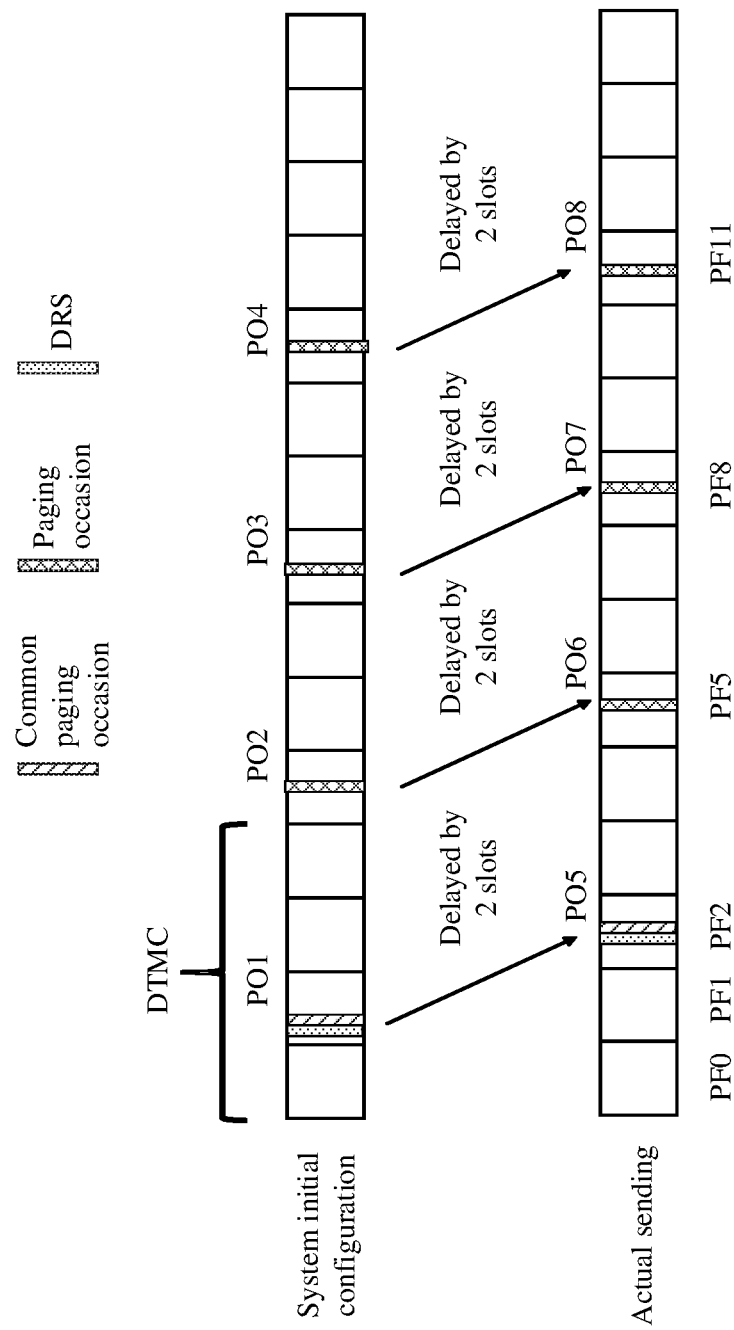
FIG. 23 is a schematic diagram of time domain positions when paging occasions outside a time window offset.

FIG. 23 shows paging occasions initially configured by a system and paging occasions of actually sent paging messages. When the paging indication information transmitted by the base station is included in the DRS, and the paging indication information further includes an offset amount field, due to the LBT, if DRS transmission is delayed by 2 slots (for example, 2 ms) compared with an expected position (for example, a PO1), in this case, the value of the 1 bit added to the paging indication information may be 1. When receiving the DRS, the UE may determine, based on the 1 bit of the paging indication information in the DRS, a time of an actual occasion of receiving the paging message. To be specific, the UE determines that paging message reception needs to be delayed. Then, for paging occasions outside a DTMC window, for example, when the UE receives the paging message, a PO2, a PO3, and a PO4 that are originally configured by the system are correspondingly delayed by 2 slots, and are correspondingly updated as a PO6, a PO7, and a PO8.

Figure 24:
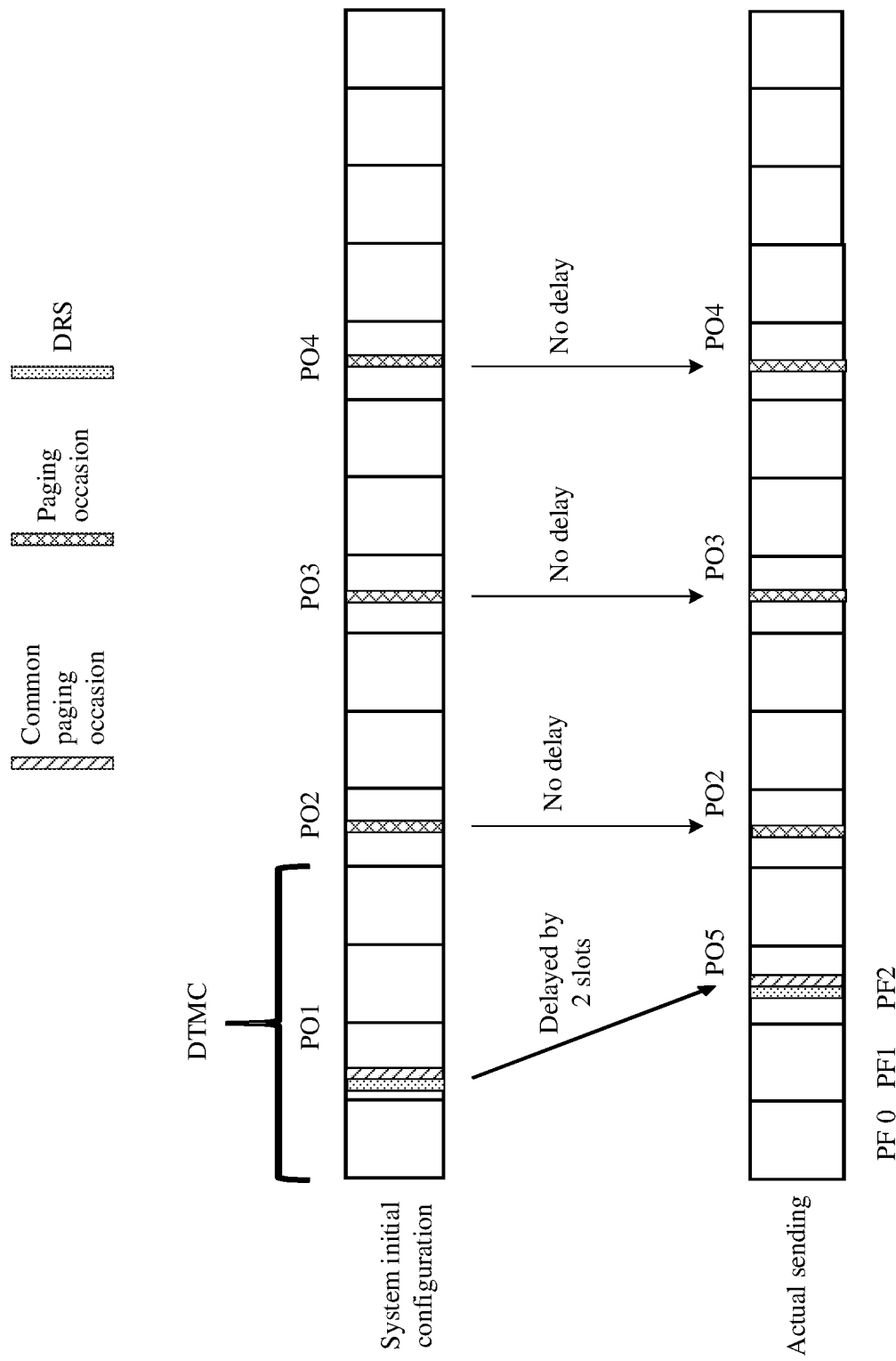
FIG. 24 is a schematic diagram of time domain positions when a paging occasion in a time window offsets.

As shown in FIG. 24, compared with FIG. 23, slot positions of the PO2, the PO3, and the PO4 may alternatively not offset, and only a position of the DRS sent in the DTMC window and a position of a common paging PO1 offset. Specifically, due to LBT, the DRS is delayed by 2 slots (for example, 2 ms) compared with the expected position (for example, the PO1). To be specific, the base station originally agreed to send the DRS and the paging message on the PO1, and due to LBT, sending is delayed by 2 slots. When the value of the 1 bit added to the paging indication information in the DRS is 0, it indicates that none of the paging occasions outside the DTMC window are delayed. To be specific, none of the paging occasions: the PO2, the PO3, and the PO4 are delayed, and the base station still sends the paging message on the original POs. Correspondingly, a paging group corresponding to the PO2 starts to detect the paging message on the PO2, a paging group corresponding to the PO3 starts to detect the paging message on the PO3, and a paging group corresponding to the PO4 starts to detect the paging message on the PO4. In this case, only a time domain position of the PO1 in the DTMC window offsets, and is delayed by 2 slots from the PO1.

In this way, positions of POs under impact of LBT are indicated in the paging indication information, so that an amount of blind detection performed by the UE on the paging message to be received can be reduced, thereby reducing UE power consumption.

Figure 25:
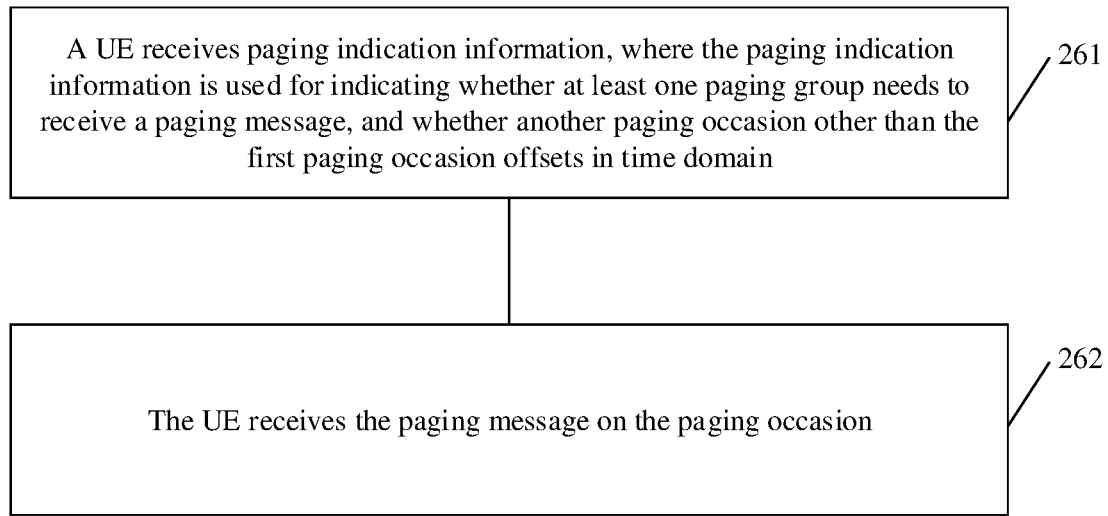
FIG. 25 is a schematic flowchart of a paging indication information receiving method according to an embodiment of this application.

An embodiment of this application further provides a paging indication information receiving method. Using an example in which a network device is a base station and a terminal device is a UE, referring to FIG. 25, the method includes the following steps.

261. The UE receives paging indication information, where the paging indication information is used for indicating whether at least one paging group needs to receive a paging message, and whether another paging occasion other than the first paging occasion offsets in time domain.

262. The UE receives the paging message on a paging occasion.

Refer to steps 231 and 232 for an implementation of this embodiment. Details are not described herein again.

Figure 26:
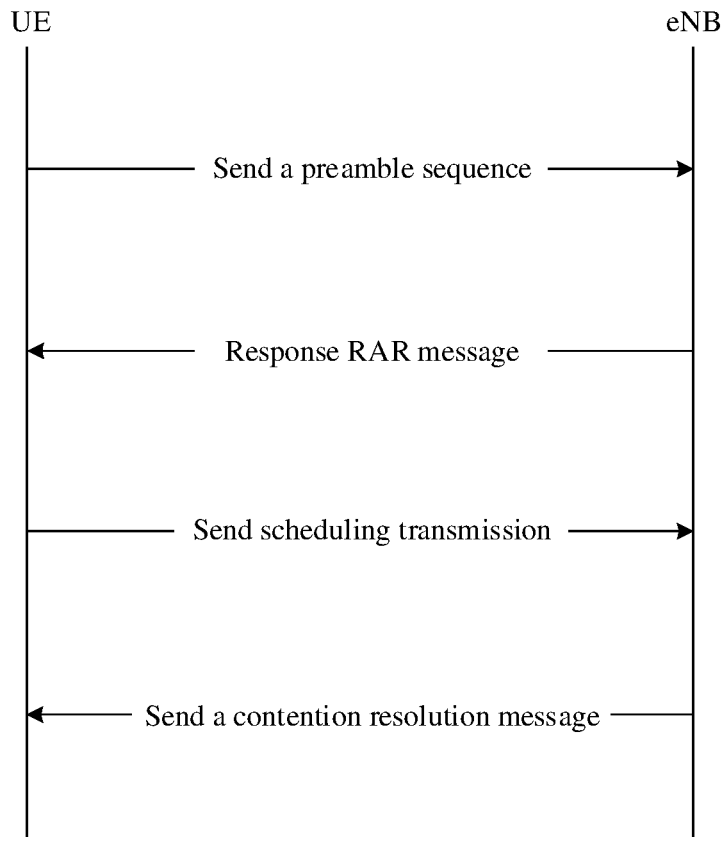
FIG. 26 is an interaction diagram of a random access process after a UE receives a paging message according to an embodiment of this application.

Based on sending of the paging message by using the foregoing method in this application, after the UE receives the paging message, a UE in a non-connected state needs to perform random access. In a 4G/5G wireless communications system, a process of the random access may be shown in FIG. 26 and includes the following four steps:

(1) The UE sends an MSG 1 (message 1) message (random access preamble).

To be specific, the UE randomly selects a preamble sequence, which may also be referred to as a random access preamble sequence (random access preamble), and sends the preamble sequence on a random access channel (random access channel, RACH).

After sending the preamble sequence, the UE receives, in an RAR response window (ra-response window), an RAR (random access response) message returned by the base station, where the message is also referred to as an MSG 2 (message 2). If the MSG 2 is received within the RAR response window, proceed to step (3), and otherwise, continue to perform step (1).

(2) The base station sends a response RAR message.

After detecting that the preamble sequence is sent, the base station sends the RAR message in a downlink, where the RAR message should include at least the following information, including a number of the preamble sequence received by the base station, timing adjustment information, uplink resource location indication information allocated to the UE, and a temporarily allocated cell radio network temporary identifier (cell radio network temporary identifier, C-RNTI).

(3) The UE sends scheduling transmission, namely, an MSG 3 (message 3).

After receiving the response RAR message, the UE sends an uplink message on an allocated uplink resource based on an indication in the response RAR message.

(4) The base station sends a contention resolution (contention resolution) message, namely, an MSG 4 (message 4).

When receiving the uplink message of the UE, the base station may consider that access by the UE succeeds, and return a conflict resolution message to the UE that performs successful access. Herein, if the UE receives the MSG 4, but data demodulation is incorrect, the UE feeds back negative acknowledgment (negative acknowledgment, NAK) information, and requests the base station to resend the MSG 4.

In the foregoing random access process, in the first step (1) of random access, the UE needs to send the MSG 1 on a candidate resource for uplink random access (the resource is configured by the base station by using a system message, and includes time domain information, frequency domain information, subband information, and the like). To reduce a failure rate when the UE performs random access, in this embodiment of this application, when sending the paging message, the base station may indicate, in the paging message, invalid candidate resources for uplink random access. In this way, the UE can avoid using these invalid candidate resources for uplink random access, to send the MSG 1, thereby increasing a success rate of random access performed by the UE.

In addition, the base station may also add other random access configuration information to the paging message based on network load when the paging message is sent. For example, the other random access configuration information may include random access process contention resolution timer duration (ra-contention resolution timer), a random response window length (ra-response window), and an MSG 1 mapping frequency or subband start position (msg 1-frequency start). As such, the base station can properly set a related parameter based on a network load status when the paging message is sent, to reduce a random access delay and improve user perception.

The ra-response window may be understood as a time for the UE to wait for a response from the base station after sending the MSG 1. If the UE does not receive the response from the base station within the time (for example, 3 ms), the UE continues to send the MSG 1. If a value of the time is set to be excessively small, processing complexity of the base station increases. If the value of the time is set to be excessively large, a random response delay is excessively large. Therefore, the base station may set a proper window length based on the network load status when the paging message is sent (for example, a quantity of UEs and a cell interference level), to help reduce the random access delay. For example, when the base station sends the paging message, if a quantity of to-be-paged UEs is relatively large, the time for waiting for the response from the base station may be set to be relatively long, or if a quantity of to-be-paged UEs is relatively small, the time for waiting for the response from the base station is set to be relatively short. Alternatively, when the base station sends the paging message, if an interference level of a cell in which a to-be-paged UE is located is relatively high, the time for waiting for the response from the base station may be set to be relatively long, or if an interference level of a cell in which a to-be-paged UE is located is relatively low, the time for waiting for the response from the base station is set to be relatively short.

The ra-contention resolution timer may be understood as a time for the UE to wait for the response from the base station after sending the MSG 3. If no response from the base station is received within the time, the random access process is initiated again. If a value of the time is set to be excessively small, processing complexity of the base station is increased. If the value of the time is set to be excessively large, the random response delay is excessively large. Therefore, the base station may set a proper window length based on the network load when the paging message is sent, for example, a quantity of to-be-paged UEs and a cell interference level, to help reduce the random access delay. For example, when the base station sends the paging message, if a quantity of to-be-paged UEs is relatively large, the time for waiting for the response from the base station may be set to be relatively long, or if a quantity of to-be-paged UEs is relatively small, the time for waiting for the response from the base station is set to be relatively short. Alternatively, when the base station sends the paging message, if an interference level of a cell in which a to-be-paged UE is located is relatively high, the time for waiting for the response from the base station may be set to be relatively long, or if an interference level of a cell in which a to-be-paged UE is located is relatively low, the time for waiting for the response from the base station is set to be relatively short.

The MSG 1-frequency start may be understood as follows: On an unlicensed spectrum, interference levels of different frequency domains/subbands are different, and the base station sets a proper start frequency band or subband based on a network status when the paging message is sent, for example, an LBT status of the subband. This helps the UE effectively send an uplink physical random access channel (physical random access channel, PRACH), that is, effectively send the MSG 1. For example, if LBT of one of four subbands is unsuccessful, one subband from the other three subbands may be selected and set as the start subband. The solutions provided in the embodiments of this application are mainly described above from a perspective of interaction between network elements. It may be understood that, to implement the foregoing functions, the network elements such as the network device and the terminal device include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the network device and the terminal device may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used.

Figure 27:
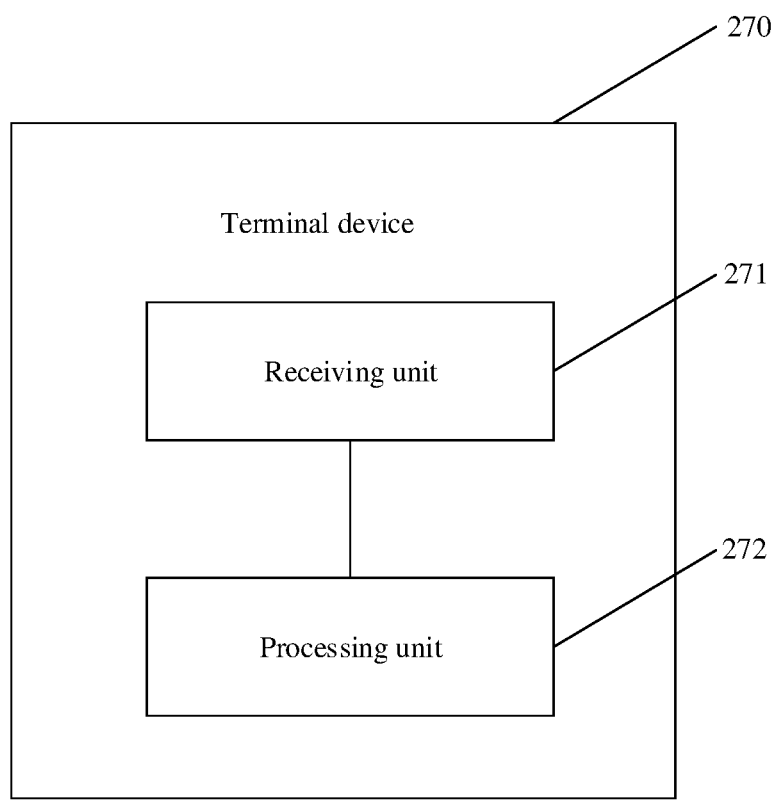
FIG. 27 is a schematic diagram of a structure of a terminal device according to an embodiment of this application.

When functional modules are obtained through division based on corresponding functions, FIG. 27 is a possible schematic diagram of a structure of a terminal device in the foregoing embodiment. The terminal device 270 includes a receiving unit 271 and a sending unit 272. The receiving unit 271 is configured to support the terminal device in performing the processes 112 and 116 in FIG. 10, the process 192 in FIG. 18, the processes 221 and 222 in FIG. 21, and the processes 261 and 262 in FIG. 25. The processing unit 272 is configured to support the terminal device in performing the process 114 in FIG. 10 and the process 191 in FIG. 18. For all related content of the steps involved in the foregoing method embodiments, refer to function descriptions of corresponding functional modules, and details are not described herein again.

Figure 28:
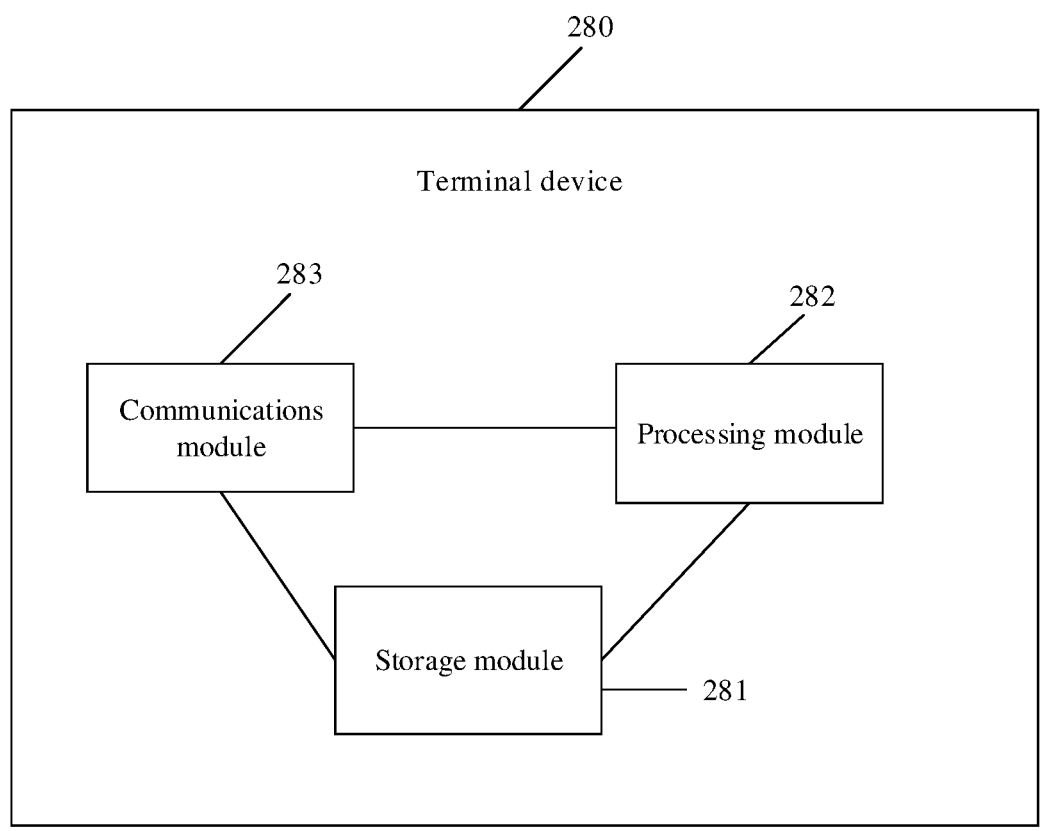
FIG. 28 is a schematic diagram of a structure of a terminal device according to an embodiment of this application.

When an integrated unit is used, FIG. 28 is a possible schematic diagram of a structure of a terminal device in the foregoing embodiments. The terminal device 280 includes a processing module 282 and a communications module 283. The processing module 282 is configured to control and manage an action of the terminal device. For example, the processing module 282 is configured to support the terminal device in performing the process 114 in FIG. 10, the process 191 in FIG. 18, and/or another process used for the technology described in this specification. The communications module 283 is configured to support the terminal device in communicating with another network entity, for example, communicating with a functional module or a network entity shown in FIG. 7 or FIG. 8A or a network entity. The terminal device may further include a storage module 281, configured to store program code and data of the terminal device. The processing module 282 is equivalent to the foregoing processing unit 272, and the communications module 283 may include the foregoing receiving unit 271 and a sending unit.

The processing module 282 may be a processor or a controller, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 283 may be a transceiver, a transceiver circuit, a communications interface, or the like. The storage module 281 may be a memory.

Figure 29:
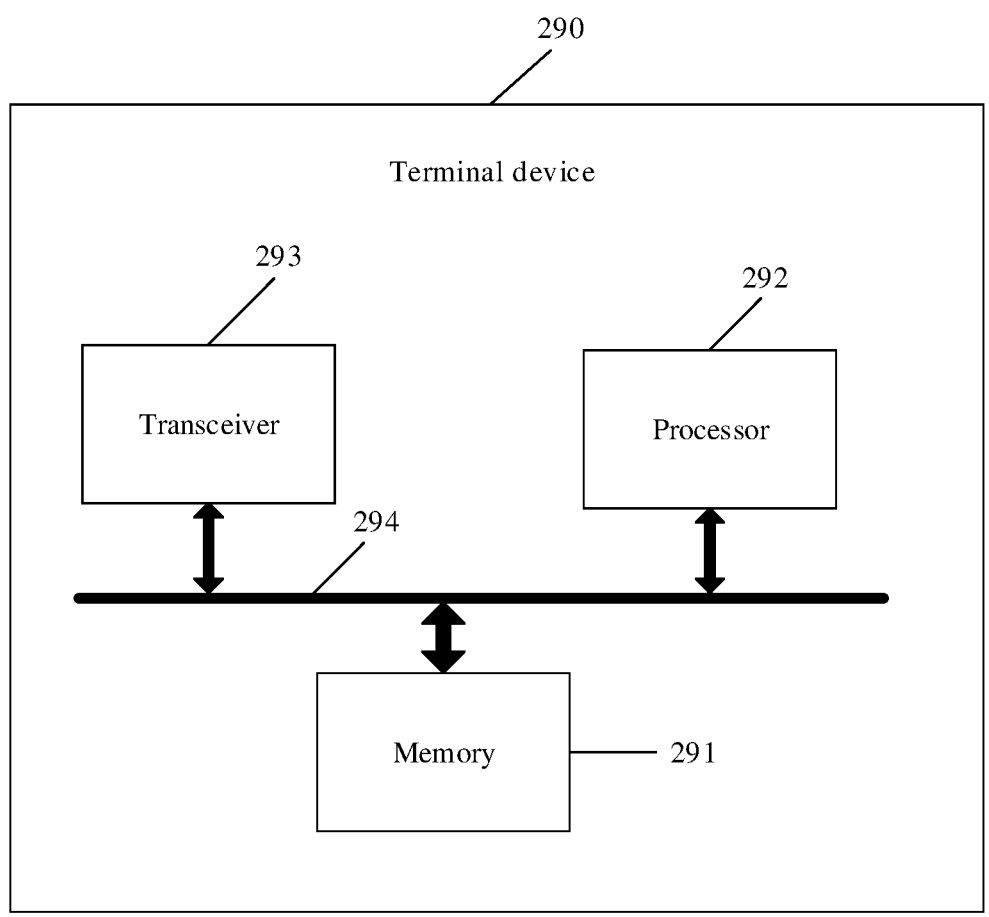
FIG. 29 is a schematic diagram of a structure of a terminal device according to an embodiment of this application.

When the processing module 282 is a processor, the communications module 283 is a transceiver, and the storage module 281 is a memory, the terminal device used in the embodiments of this application may be a terminal device shown in FIG. 29.

Refer to FIG. 29. The terminal device 290 includes a processor 292, a transceiver 293, a memory 291, and a bus 294. The transceiver 293, the processor 292, and the memory 291 are connected to each other by using the bus 294. The bus 294 may be a peripheral component interconnect (peripheral component interconnect, PCI) standard bus, an extended industry standard architecture (extended industry standard architecture, EISA) bus, or the like. The bus may be classified into an address bus, a data bus, a control bus, or the like. For ease of representation, only one thick line is used to represent the bus in FIG. 29, but this does not mean that there is only one bus or only one type of bus.

Figure 30:
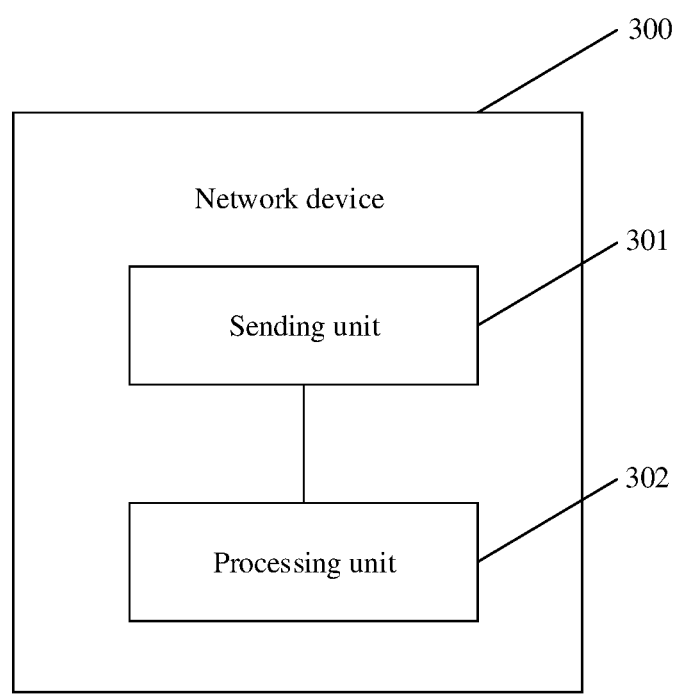
FIG. 30 is a schematic diagram of a structure of a network device according to an embodiment of this application.

When each function module is obtained through division based on each corresponding function, FIG. 30 is a possible schematic diagram of a structure of a network device in the foregoing embodiments. The network device 300 includes a sending unit 301 and a processing unit 302. The sending unit 301 is configured to support the network device in performing the processes 111 and 115 in FIG. 10, the process 172 in FIG. 16, the processes 201 and 202 in FIG. 19, and the processes 231 and 232 in FIG. 22. The processing unit 302 is configured to support the network device in performing the process 113 in FIG. 10 and the process 171 in FIG. 16. For all related content of the steps involved in the foregoing method embodiments, refer to function descriptions of corresponding functional modules, and details are not described herein again.

Figure 31:
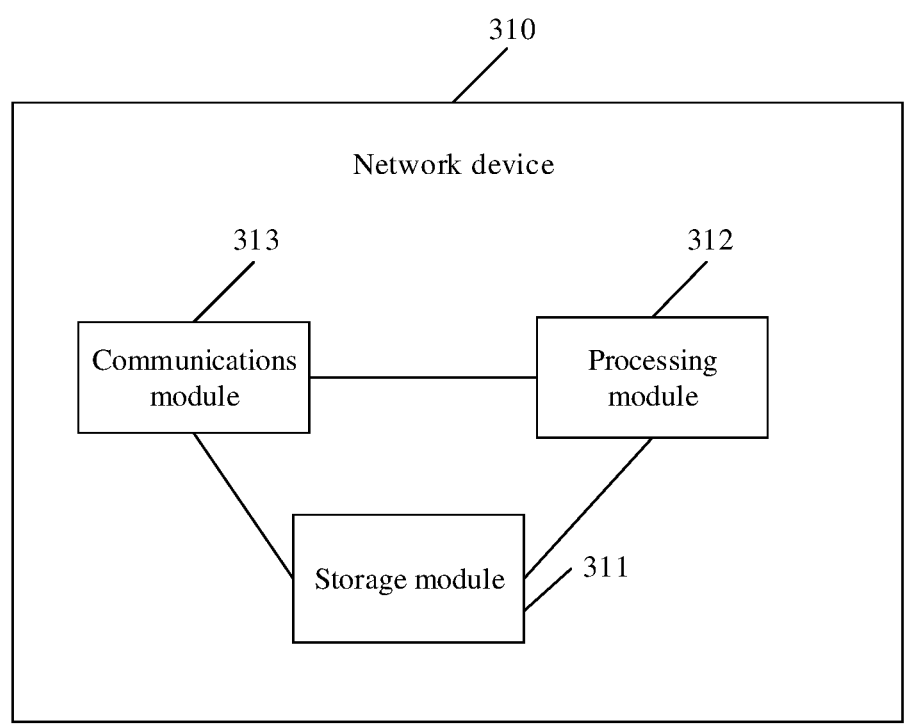
FIG. 31 is a schematic diagram of a structure of a network device according to an embodiment of this application.

When an integrated unit is used, FIG. 31 is a possible schematic diagram of a structure of a network device in the foregoing embodiments. The network device 310 includes a processing module 312 and a communications module 313. The processing module 312 is configured to control and manage actions of the network device. For example, the processing module 312 is configured to support the network device in executing the process 113 in FIG. 10, the process 171 in FIG. 16, and/or another process used for the technology described in this specification. The communications module 313 is configured to support communication between the network-side device and another network entity, for example, communication between the network-side device and the function module or the network entity that is shown in FIG. 7 or FIG. 9. The network device may further include a storage module 311, configured to store program code and data of the network device. The processing module 312 is equivalent to the foregoing processing unit 302, and the communications module 313 may include the foregoing sending unit 301 and a receiving unit.

The processing module 312 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 313 may be a transceiver, a transceiver circuit, a communications interface, or the like. The storage module 311 may be a memory.

Figure 32:
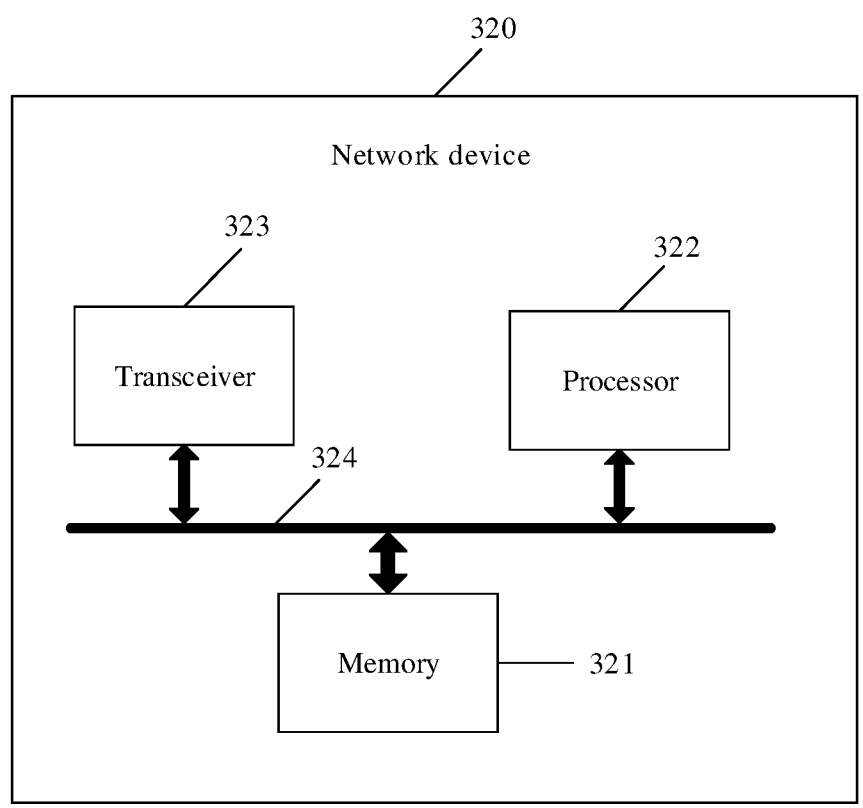
FIG. 32 is a schematic diagram of a structure of a network device according to an embodiment of this application.

When the processing module 312 is a processor, the communications module 313 is a transceiver, and the storage module 311 is a memory, the network device used in the embodiments of this application may be a network device shown in FIG. 32.

Refer to FIG. 32. The network device 320 includes a processor 322, a transceiver 323, a memory 321, and a bus 324. The transceiver 323, the processor 322, and the memory 321 are connected to each other through the bus 324. The bus 324 may be a PCI bus, an EISA bus, or the like. The bus may be classified into an address bus, a data bus, a control bus, or the like. For ease of representation, only one thick line is used to represent the bus in FIG. 32, but this does not mean that there is only one bus or only one type of bus.

Figure 33:
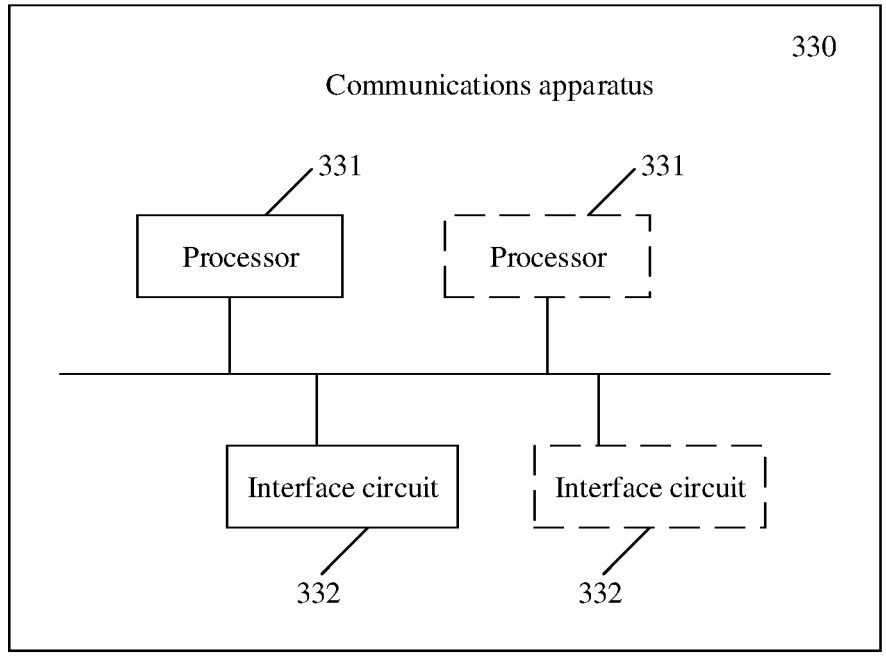
FIG. 33 is a schematic diagram of a structure of a communications apparatus according to an embodiment of this application.

An embodiment of this application provides a communications apparatus 330. As shown in FIG. 33, the communications apparatus includes one or more interface circuits 332 and one or more processors 331. The processor 331 and the interface circuit 332 may be connected to each other through a line. The interface circuit 332 is configured to: receive a code instruction from another apparatus (for example, a memory of a terminal device) and send a signal to another apparatus (for example, the processor 331). For example, the interface circuit 332 may read instructions stored in the memory, and send the instructions to the processor 331. When the instruction is executed by the processor 331, the terminal device may be enabled to perform steps related to the terminal device in the foregoing embodiments. Certainly, the communications apparatus 330 may further include another discrete device. This is not specifically limited in this embodiment of this application.

Figure 34:
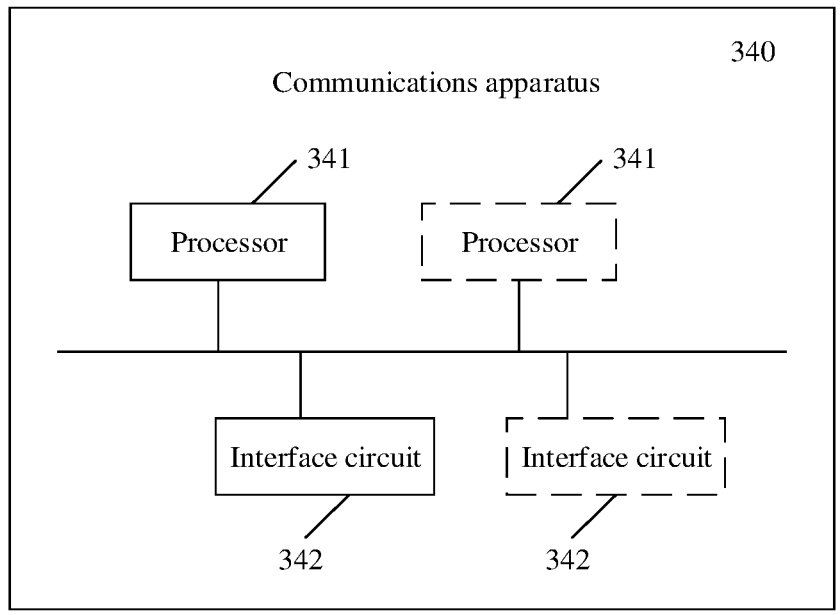
FIG. 34 is a schematic diagram of a structure of a communications apparatus according to an embodiment of this application.

An embodiment of this application provides a communications apparatus 340. As shown in FIG. 34, the communications apparatus includes one or more interface circuits 342 and one or more processors 341. The processor 341 and the interface circuit 342 may be connected to each other through a line. The interface circuit 342 is configured to: receive a code instruction from another apparatus (for example, a memory of a network device) and send a signal to another apparatus (for example, the processor 341). For example, the interface circuit 342 may read instructions stored in the memory, and send the instructions to the processor 341. When the instruction is executed by the processor 341, the network device may be enabled to perform steps related to the network device in the foregoing embodiments. Certainly, the communications apparatus 340 may further include another discrete device. This is not specifically limited in this embodiment of this application.

An embodiment of this application further provides a computer storage medium. The computer storage medium includes computer instructions. When run on the foregoing electronic device, the computer instructions enable the terminal device to perform functions or steps performed by the UE in the foregoing method embodiments.

An embodiment of this application further provides a computer storage medium. The computer storage medium includes computer instructions. When run on the foregoing electronic device, the computer instructions enable the network device to perform functions or steps performed by the base station in the foregoing method embodiments.

An embodiment of this application further provides a computer program product. When the computer program product runs on a computer, the computer is enabled to perform the functions or steps performed by the UE in the descriptions of the foregoing method embodiments.

An embodiment of this application further provides a computer program product. When the computer program product runs on a computer, the computer is enabled to perform the functions or steps performed by the base station in the descriptions of the foregoing method embodiments.

In combination with the examples described in the embodiments disclosed in this application, methods or algorithm steps may be implemented by hardware, or a processor executing a software instruction. The software instruction may include a corresponding software module. The software module may be stored in a random access memory (RAM), a flash memory, a read-only memory (ROM), an erasable programmable read-only memory (erasable programmable ROM, EPROM), an electrically erasable programmable read-only memory (electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, functions described in this application may be implemented by using hardware, software, firmware, or any combination thereof. When this application is implemented by using software, the foregoing functions may be stored in a computer-readable medium or transmitted as one or more instructions or code in the computer-readable medium. The computer-readable medium includes a computer storage medium and a communications medium, where the communications medium includes any medium that facilitates transmission of a computer program from one place to another. The storage medium may be any available medium accessible to a general-purpose or special-purpose computer.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A paging message receiving method, comprising:
receiving, by a terminal device, paging indication information from a network device, wherein the paging indication information indicates whether at least one paging group needs to receive a paging message; and
determining, by the terminal device based on the paging indication information,
a number m of a first paging group that needs to receive the paging message;
determining a number n of a paging group in which the terminal device is located; and
determining, by the terminal device, that a number of a paging occasion on which the paging group in which the terminal device is located receives the paging message is n−m+1, wherein n and m are each positive integers less than or equal to a quantity of paging groups.

2. The method according to claim 1, wherein the paging indication information comprises N bits, wherein each bit in the N bits corresponds to one paging group, and wherein N is the quantity of paging groups.

3. The method according to claim 2, wherein the determining the paging occasion on which the paging group in which the terminal device is located receives the paging message comprises:
skipping, by the terminal device, in response to the terminal device determining, based on the paging indication information, that the paging group in which the terminal device is located does not need to receive the paging message, at least one of determining the paging occasion, or receiving the paging message on the corresponding paging occasion.

4. The method according to claim 2, wherein the determining the paging occasion on which the paging group in which the terminal device is located receives the paging message comprises:
determining a number m of a first paging group that needs to receive the paging message;
determining a number n of the paging group in which the terminal device is located; and
performing at least one of:
determining, by the terminal device, in response to n=m, that a number of the paging occasion on which the paging group in which the terminal device is located receives the paging message is 1; or
determining, by the terminal device, in response to n≠m, that the number of the paging occasion on which the paging group in which the terminal device is located receives the paging message is n, wherein n and m are each positive integers less than or equal to N.

5. A paging message sending method, comprising:
sending, by a network device, paging indication information, wherein the paging indication information indicates whether at least one paging group needs to receive a paging message; and
determining, by the network device based on the paging indication information, a number m of a first paging group that needs to receive the paging message;
determining a number n of each paging group in the at least one paging group; and
determining that a number of a paging occasion of sending the paging message to each paging group in the at least one paging group is n−m+1, wherein n and m are positive integers less than or equal to a quantity of paging groups.

6. The method according to claim 5, wherein the paging indication information comprises N bits, wherein each bit in the N bits corresponds to one paging group, and wherein N is the quantity of paging groups.

7. The method according to claim 6, wherein the determining the paging occasion of sending the paging message to each paging group in the at least one paging group comprises:
determining that a number of a first paging occasion on which the paging message needs to be received is 1; and
determining that the number of the paging occasion of sending the paging message to each paging group in the at least one paging group is a number n of each paging group, wherein n is a positive integer less than or equal to N.

8. The method according to claim 6, wherein the determining the paging occasion of sending the paging message to each paging group in the at least one paging group comprises:
skipping, by the network device, in response to the network device determining, based on the paging indication information, that the at least one paging group does not need to receive the paging message, sending the paging message to the at least one paging group on the corresponding paging occasion.

9. A communications apparatus, comprising:
one or more processors; and
one or more non-transitory memories storing a computer program for execution by the one or more processors, the compute program including instructions to :
receive paging indication information from a network device, wherein the paging indication information indicates whether at least one paging group needs to receive a paging message; and
determine, based on the paging indication information, a number m of a first paging group that needs to receive the paging message;
determine a number n of a paging group in which the communications apparatus is located; and
determine that a number of a paging occasion on which the paging group in which the communications apparatus is located receives the paging message is n−m+1, wherein n and m are each positive integers less than or equal to a quantity of paging groups.

10. The apparatus according to claim 9, wherein the paging indication information comprises N bits, wherein each bit in the N bits corresponds to one paging group, and wherein N is the quantity of paging groups.

11. The apparatus according to claim 10, wherein the instructions to determine the paging occasion on which the paging group in which the communications apparatus is located receives the paging message include instructions to:
determine a number m of a first paging group that needs to receive the paging message;
determine a number n of the paging group in which the communications apparatus is located; and
perform at least one of:
determine, in response to n=m, that a number of the paging occasion on which the paging group in which the communications apparatus is located receives the paging message is 1; or
determine, in response to n≠m, that the number of the paging occasion on which the paging group in which the communications apparatus is located receives the paging message is n, wherein n and m are each positive integers less than or equal to N.

12. The apparatus according to claim 10, wherein the instructions to determine the paging occasion on which the paging group in which the communications apparatus is located receives the paging message include instructions to:
skip, in response to determining, based on the paging indication information, that the paging group in which the communications apparatus is located does not need to receive the paging message, at least one of determining the paging occasion, or receiving the paging message on the corresponding paging occasion.

13. A communications apparatus, comprising:
one or more processors; and
one or more non-transitory memories storing a computer program for execution by the one or more processors, the computer program including instructions to :
send paging indication information, wherein the paging indication information indicates whether at least one paging group needs to receive a paging message; and
determine, based on the paging indication information, a number m of a first paging group that needs to receive the paging message;
determine a number n of each paging group in the at least one paging group; and
determine that a number of a paging occasion of sending the paging message to each paging group in the at least one paging group is n−m+1, wherein each of n and m are positive integers less than or equal to N.

14. The apparatus according to claim 13, wherein the paging indication information comprises N bits, wherein each bit in the N bits corresponds to one paging group, and wherein N is a quantity of paging groups.

15. The apparatus according to claim 14, wherein the instructions to determine the paging occasion of sending the paging message to each paging group in the at least one paging group include instructions to:
determine that a number of the first paging occasion on which the paging message needs to be received is 1; and
determine that a number of the paging occasion of sending the paging message to each paging group in the at least one paging group is a number n of each paging group, wherein n is a positive integer less than or equal to N.

16. The apparatus according to claim 14, wherein the instructions to determine the paging occasion of sending the paging message to each paging group in the at least one paging group include instructions to:
skip sending the paging message to the at least one paging group on the corresponding paging occasion in response to the communications apparatus determining, based on the paging indication information, that the at least one paging group does not need to receive the paging message.

* * * * *